(12) United States Patent
Fu et al.

(10) Patent No.: US 12,333,681 B1
(45) Date of Patent: Jun. 17, 2025

(54) TARGETED GENERATIVE VISUAL EDITING OF IMAGES

(71) Applicant: META PLATFORMS TECHNOLOGIES, LLC, Menlo Park, CA (US)

(72) Inventors: Cheng-Yang Fu, San Francisco, CA (US); Tamara L. Berg, Laguna Beach, CA (US); Andrew Brown, New York, NY (US); Nicole Gallagher, Astoria, NY (US); Sen He, London (GB); Omkar Moreshwar Parkhi, Cupertino, CA (US); Antoine Toisoul, London (GB); Andrea Vedaldi, Oxford (GB); Tao Xiang, Ruislip (GB); Yanping Xie, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 138 days.

(21) Appl. No.: 18/067,598

(22) Filed: Dec. 16, 2022

(51) Int. Cl.
*G06T 5/50* (2006.01)
*G06T 9/00* (2006.01)
*G06V 10/25* (2022.01)
*G06V 10/82* (2022.01)

(52) U.S. Cl.
CPC .............. *G06T 5/50* (2013.01); *G06T 9/00* (2013.01); *G06V 10/25* (2022.01); *G06V 10/82* (2022.01); *G06T 2207/20081* (2013.01); *G06T 2207/20132* (2013.01); *G06T 2207/20221* (2013.01)

(58) Field of Classification Search
CPC ............. G06T 5/50; G06T 2207/20081; G06T 2207/20221; G06V 10/82; G06N 3/02; G06N 3/0455; G06N 3/0475
See application file for complete search history.

(56) References Cited

U.S. PATENT DOCUMENTS 11,127,139 B2 * 9/2021 Zhang et al. ............. G06T 7/11
2022/0392255 A1 * 12/2022 Moustafa ............... G06V 10/60

OTHER PUBLICATIONS

Ramesh A., et al., "Zero-Shot Text-to-Image Generation," International Conference on Machine Learning (ICML), Jul. 2021, 11 pages.

(Continued)

*Primary Examiner* — Antonio A Caschera
(74) *Attorney, Agent, or Firm* — BakerHostetler

(57) ABSTRACT

One embodiment of the present invention sets forth a technique for combining a source image and a driver image. The technique includes determining a first region of the source image to be blended with the driver image. The technique also includes inputting a second region of the source image that lies outside of the first region and the driver image into a neural network. The technique further includes generating, via the neural network, an output image that includes a third region corresponding to the first region of the source image and a fourth region corresponding to the second region of the source image, where the third region includes visual attributes of the driver image and a context associated with the source image and the fourth region includes visual attributes of the second region of the source image and the context associated with the source image.

20 Claims, 9 Drawing Sheets

(56) References Cited

OTHER PUBLICATIONS

Razavi A., et al., "Generating Diverse High-Fidelity Images with VQ-VAE-2," Advances in neural information processing systems 32, 2019, 11 pages.
Salimans T., et al., "Improved Techniques for Training Gans," arXiv, arXiv: 1606.03498v1, Jun. 10, 2016, 10 pages.
Schaldenbrand P., et al., "StyleCLIPDraw: Coupling Content and Style in Text-to-Drawing Synthesis," arXiv preprint arXiv:2111.03133v1, Nov. 4, 2021, 3 pages.
Schwettmann S., et al., "Toward a Visual Concept Vocabulary for Gan Latent Space," Proceedings of the IEEE/CVF International Conference on Computer Vision, 2021, 9 pages.
Shen Y., et al., "Interpreting the Latent Space of Gans for Semantic Face Editing," Proceedings of the IEEE/CVF Conference on Computer Vision and Pattern Recognition (CVPR), 2020, pp. 9243-9252.
Shi J., et al., "SpaceEdit: Learning a Unified Editing Space for Open-Domain Image Editing, " arXiv:2112.00180v1, Nov. 30, 2021, 20 pages.
Shocher A., et al., "Semantic Pyramid for Image Generation," Proceedings of the IEEE/CVF Conference on Computer Vision and Pattern Recognition (CVPR), 2020, 10 pages.
Szegedy C., et al., "Rethinking the Inception Architecture for Computer Vision," Proceedings of the IEEE Conference on Computer Vision and Pattern Recognition, Jun. 2016, pp. 2818-2826.
Tov O., et al., "Designing an Encoder for Stylegan Image Manipulation," arXiv:2102.02766v1, Feb. 4, 2021, 33 pages.
Tsai Y., et al., "Deep Image Harmonization," Proceedings of the IEEE Conference on Computer Vision and Pattern Recognition (CVPR), 2017, pp. 3789-3797.
Van Den Oord A., et al., "Neural Discrete Representation Learning," In Advances in Neural Information Processing Systems, Dec. 2017, pp. 1-11.
Voynov A., et al., "Unsupervised Discovery of Interpretable Directions in the GAN Latent Space," International conference on machine learning (PMLR), 2020, vol. 119, 11 pages.
Wang T-C., et al., "High-Resolution Image Synthesis and Semantic Manipulation with Conditional GANs," IEEE Conference on Computer Vision and Pattern Recognition, Aug. 20, 2018, 14 pages.
Williams R.J., et al., "A Learning Algorithm for Continually Running Fully Recurrent Neural Networks," Neural Computation, Jun. 1989, Vo. 1(2), pp. 270-280.
Wu C., et al., "NUWA: Visual Synthesis Pre-Training for Neural Visual World Creation," arXiv:2111.12417v1, Nov. 24, 2021, 28 pages.
Wu Z., et al., "Stylespace Analysis: Disentangled Controls for Stylegan Image Generation," arXiv:2011.12799v1, Nov. 25, 2020, 25 pages.
Xia W., et al., "TediGAN: Text-Guided Diverse Face Image Generation and Manipulation," Computer Vision and Pattern Recognition (CVPR), Jun. 2021, pp. 2256-2265.
Xiao Z., et al., "Generative Latent Flow.," arXiv:1905.10485, Sep. 22, 2019, 18 pages.
Xu Y., et al., "Generative Hierarchical Features from Synthesizing Images," Computer Vision and Pattern Recognition (CVPR), Jun. 2021, pp. 4432-4442.
Yang C., et al., "Semantic Hierarchy Emerges in Deep Generative Representations for Scene Synthesis," International Journal of Computer Vision, Feb. 11, 2020, 15 pages.
Yu F., et al., "LSUN: Construction of a Large-Scale Image Dataset using Deep Learning with Humans in the Loop.," arXiv:1506.03365, Jun. 19, 2015, 9 pages.
Zhang R., et al., "The Unreasonable Effectiveness of Deep Features as a Perceptual Metric," In Proceedings of the IEEE Conference on Computer Vision and Pattern Recognition, Jun. 2018, 10 pages.
Zhang Z., et al., "UFC-BERT: Unifying Multi-Modal Controls for Conditional Image Synthesis," Neural Information Processing Systems (NeurIPS), Dec. 2021, 13 pages.

Zhao S., et al., "Large Scale Image Completion via Co-Modulated Generative Adversarial Networks," International Conference on Learning Representations (ICLR), Mar. 2021, 25 pages.
Zhu J., et al., "In-Domain GAN Inversion for Real Image Editing," European Conference on Computer Vision (ECCV), Aug. 23, 2020, pp. 592-608.
Zhu J-Y., et al., Generative Visual Manipulation on the Natural Image Manifold, European Conference on Computer Vision (ECCV), Sep. 2016, pp. 597-613.
Brown A., et al., "End-to-End Visual Editing with a Generatively Pre-Trained Artist," arxiv.org, May 3, 2022, 33 pages.
European Search Report for European Patent Application No. 23207999.6, dated Mar. 27, 2024, 5 pages.
Zhang Z., et al., "M6-UFC: Unifying Multi-Modal Controls for Conditional Image Synthesis via Non-Autoregressive Generative Transformers," arXiv:2105.14211v4, Feb. 19, 2022, 17 pages.
Zhang R., et al., "The Unreasonable Effectiveness of Deep Features as a Perceptual Metric," In Proceedings of the EEE Conference on Computer Vision and Pattern Recognition, Jun. 2018, 10 pages.
Issenhuth T., et al., "EdiBERT, A Generative Model for Image Editing," arXiv:2111.15264, Nov. 30, 2021, 15 pages.
Jahanian A., et al., "On the "Steerability" of Generative Adversarial Networks," International Conference on Learning Representations (ICLR), Apr. 2020, 31 pages.
Karras T., et al., "A Style-Based Generator Architecture for Generative Adversarial Networks," In IEEE Conference on Computer Vision and Pattern Recognition (CVPR), Jun. 16-20, 2019, pp. 4401-4410.
Karras T., et al., "Analyzing and Improving the Image Quality of StyleGAN," Computer Vision and Pattern Recognition (CVPR), Jun. 2020, pp. 8110-8119.
Karras T., et al., "Training Generative Adversarial Networks with Limited Data," Neural Information Processing Systems (NeurIPS), Dec. 2020, 11 pages.
Kim H., et al., "Exploiting Spatial Dimensions of Latent in GAN for Real-Time Image Editing," Computer Vision and Pattern Recognition (CVPR), Jun. 2021, pp. 852-861.
Lipton Z.C., et al., "Precise Recovery of Latent Vectors from Generative Adversarial Networks," arXiv:1702.04782, Feb. 15, 2021, 4 pages.
Liu G., et al., "Image Inpainting for Irregular Holes using Partial Convolutions," European Conference on Computer Vision (ECCV), Sep. 2018, 16 pages.
Liu X., et al., "More Control for Free! Image Synthesis with Semantic Diffusion Guidance.", arXiv:2112.05744, Dec. 14, 2021, 16 pages.
Loshchilov I., et al., "Decoupled Weight Decay Regularization," International Conference on Learning Representations (ICLR), Jan. 2019, 19 pages.
Mokady R., et al., "Mask Based Unsupervised Content Transfer," arXiv preprint arXiv:1906.06558v1, Jun. 15, 2019, 31 pages.
Nichol A., et al., "Glide: Towards Photorealistic Image Generation and Editing with Text-Guided Diffusion Models," arXiv preprint arXiv:2112.10741, Dec. 22, 2021, 20 pages.
Park T., et al., "Semantic Image Synthesis with Spatially-Adaptive Normalization," In Conference on Computer Vision and Pattern Recognition, Mar. 18, 2019, 19 pages.
Patashnik O., et al., "Styleclip: Text-Driven Manipulation of Stylegan Imagery," Proceedings of the IEEE/CVF International Conference on Computer Vision, 2021, pp. 2085-2094.
Peebles W., et al., "The Hessian Penalty: A Weak Prior for Unsupervised Disentanglement," European Conference on Computer Vision, Nov. 7, 2020, vol. 12351, 23 pages.
Press O., et al., "Emerging Disentanglement in Auto-Encoder Based Unsupervised Image Content Transfer," International Conference on Learning Representations (ICLR), 2019, 26 pages.
Dolhansky B., et al., "The Deepfake Detection Challenge Dataset," arXiv preprint, arXiv:2006.07397v4, Oct. 28, 2020, 13 pages.
Esser P., et al., "A Disentangling Invertible Interpretation Network for Explaining Latent Representations," Computer Vision and Pattern Recognition (CVPR), Jun. 2020, pp. 9223-9232.
Esser P., et al., "Imagebart: Bidirectional Context with Multinomial Diffusion for Autoregressive Image Synthesis," Neural Information Processing Systems 34 (NeurIPS 2021), Dec. 2021, 15 pages.

(56) References Cited

OTHER PUBLICATIONS

Esser P., et al., "Taming Transformers for High-Resolution Image Synthesis," Computer Vision and Pattern Recognition (CVPR), Jun. 2021, pp. 12873-12883.
Fauw J.D., et al., "Hierarchical Autoregressive Image Models with Auxiliary Decoders," arXiv:1903.04933, Mar. 6, 2019, 21 pages.
Gafni O., et al., "Make-a-Scene: Scene-based Text-to-Image Generation with Human Priors," arXiv:2203.13131, Mar. 2022, 17 pages.
Galatolo F.A., et al., "Generating Images From Caption and Vice Versa via Clip-Guided Generative Latent Space Search," International Conference on Image Processing and Vision Engineering (2021), Feb. 2021, 10 pages.
Ghosh P., et al., "InvGAN: Invertible GANs," arXiv:2112.04598, Dec. 8, 2021, 15 pages.
Goyal A., et al., "Professor Forcing: A New Algorithm for Training Recurrent Networks," Neural Information Processing Systems (NeurIPS), Dec. 2016, pp. 4608-4616.
Guan S., et al., "Collaborative Learning for Faster Stylegan Embedding," arXiv:2007.01758, Jul. 3, 2020, pp. 4321-4330.
Harkonen E., et al., "GANSpace: Discovering Interpretable GAN Controls," arXiv:2004.02546, Apr. 6, 2020, 14 pages.
Heusel M., et al., "GANs Trained by a Two Time-Scale Update Rule Converge to a Local Nash Equilibrium," Advances in Neural Information Processing Systems, 2017, 12 pages.
Holtzman A., et al., "The Curious Case of Neural Text Degeneration," International Conference on Learning Representations (ICLR), Apr. 2020, 16 pages.
Iizuka S., et al., "Globally and Locally Consistent Image Completion," ACM Transactions on Graphics, Jul. 2017, vol. 36, No. 4, pp. 107:1-107:14.
Isola P., et al., "Scene Collaging: Analysis and Synthesis of Natural Images with Semantic Layers," International Conference on Computer Vision (ICCV), Dec. 2013, 8 pages.
Isola P., et al., "Image-to-Image Translation with Conditional Adversarial Networks," IEEE Conference on Computer Vision and Pattern Recognition 2017, Nov. 26, 2018, 17 pages.
Radford A., et al., "Language Models are Unsupervised Multitask Learners," 2019, 24 pages.
Radford A., et al., "Unsupervised Representation Learning with Deep Convolutional Generative Adversarial Networks," International Conference on Learning Representations, Jan. 2016, 16 pages.
Ramesh A., et al., "Hierarchical Text-Conditional Image Generation with Clip Latents," arXiv preprint arXiv:2204.06125, Apr. 13, 2022, 22 pages.
Dai B., et al., "Diagnosing and Enhancing VAE Models," International Conference on Learning Representations (ICLR), May 2019, 12 pages.
Deng J., et al., "ImageNet: A Large-Scale Hierarchical Image Database," 2009 IEEE Conference on Computer Vision and Pattern Recognition, Aug. 18, 2009, 8 Pages.
Devlin J., et al., "BERT: Pre-Training of Deep Bidirectional Transformers for Language Understanding," In Proceedings of the 2019 Confer-ence of the North American Chapter of the Association for Computational Linguistics: Human Language Tech-nologies, vol. 1 (Long and Short Papers), May 2019, 16 pages.
Ding M., et al., "CogView: Mastering Text-to-Image Generation via Transformers," Neural Information Processing Systems 34 (NeurIPS 2021), 14 pages.
Abdal R., et al., "CLIP2StyleGAN: Unsupervised Extraction of StyleGAN Edit Directions," arXiv:2112.05219, Dec. 9, 2021, 17 pages.
Abdal R., et al., "Image2stylegan++: How to Edit the Embedded Images?," Computer Vision and Pattern Recognition (CVPR), Jun. 2020, pp. 8296-8305.
Abdal R., et al., "Image2StyleGAN: How to Embed Images into the StyleGAN Latent Space?," In Proceedings of the IEEE International Conference on Computer Vision, Oct. 27-Nov. 2, 2019, pp. 4432-4441.
Bau D., et al., "Semantic Photo Manipulation with a Generative Image Prior," ACM Transactions on Graphics, Jul. 2019, vol. 38, No. 4, pp. 59:1-59:11.
Bau D., et al., "Inverting Layers of A Large Generator," ICLR 2019 Debugging Machine Learning Models Workshop, May 2019, 4 pages.
Bau D., et al., "Paint by Word," arXiv:2103.10951, Mar. 19, 2021, 10 pages.
Bau D., et al., "Understanding the Role of Individual Units in a Deep Neural Network," Proceedings of the National Academy of Sciences (PNAS), Sep. 1, 2020, vol. 117, No. 48, pp. 30071-30078.
Chai L., et al., "Using Latent Space Regression to Analyze and Leverage Compositionality in GANs," International Conference on Learning Representations (ICLR), May 2021, 30 pages.
Chen M., et al., "Generative Pretraining from Pixels," International Conference on Machine Learning (ICML), Jul. 2020, 13 pages.
Choi Y., et al., "StarGAN: Unified Generative Adversarial Networks for Multi-Domain Image-to-Image Translation," Computer Vision and Pattern Recognition (CVPR), Jun. 2018, pp. 8789-8797.
Crowson K: "VQGAN-CLIP," Retrieved from the Internet: https://github.com/nerdyrodent/VQGAN-CLIP, 2021, 5 pages.

\* cited by examiner

TARGETED GENERATIVE VISUAL EDITING OF IMAGES

BACKGROUND

Field of the Various Embodiments

Embodiments of the present disclosure relate generally to machine learning and image editing and, more specifically, to targeted generative visual editing of images.

Description of the Related Art

Recent technological advances have led to machine learning models that are capable of modifying or editing images in a semantically meaningful manner. For example, machine learning models can be trained to perform image editing tasks such as denoising, sharpening, blurring, colorization, compositing, super-resolution, inpainting (e.g., filling in a missing region of an image), and/or outpainting (e.g., extending an image beyond the original borders). These image editing tasks commonly uses text-based descriptions to guide the resulting output images. For example, a machine learning model could perform inpainting by filling in a missing region of an image with content that reflects a text-based prompt from a user.

However, visual content that matches a given text-based description can vary widely in appearance. Consequently, machine learning models that use text-based descriptions to perform image editing can generate output images that conform to the text-based descriptions but do not include the desired visual attributes. Continuing with the above example, the user could provide a text-based prompt specifying that a missing region of an image of a red car should be filled in with a blue car door of a certain shape or style. While the machine learning model could generate an output image that matches the prompt, the car door depicted in the output image could include a hue, saturation, lightness, brightness, and/or another color-based attribute that differs from the color appearance desired by the user. The shape or style of the car door could also match the prompt but fail to match the appearance intended by the user.

As the foregoing illustrates, what is needed in the art are more effective techniques for performing image editing using machine learning models.

SUMMARY

One embodiment of the present invention sets forth a technique for combining a source image and a driver image. The technique includes determining a first region of the source image to be blended with the driver image. The technique also includes inputting a second region of the source image that lies outside of the first region and the driver image into a neural network. The technique further includes generating, via the neural network, an output image that includes a third region corresponding to the first region of the source image and a fourth region corresponding to the second region of the source image, where the third region includes visual attributes of the driver image and a context associated with the source image and the fourth region includes visual attributes of the second region of the source image and the context associated with the source image.

One technical advantage of the disclosed techniques relative to the prior art is the use of visual attributes that are depicted in a driver image in guiding an image editing task. Accordingly, the disclosed techniques allow image editing tasks to be performed with greater precision and control than conventional approaches that rely on text-based descriptions of visual content to edit images. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
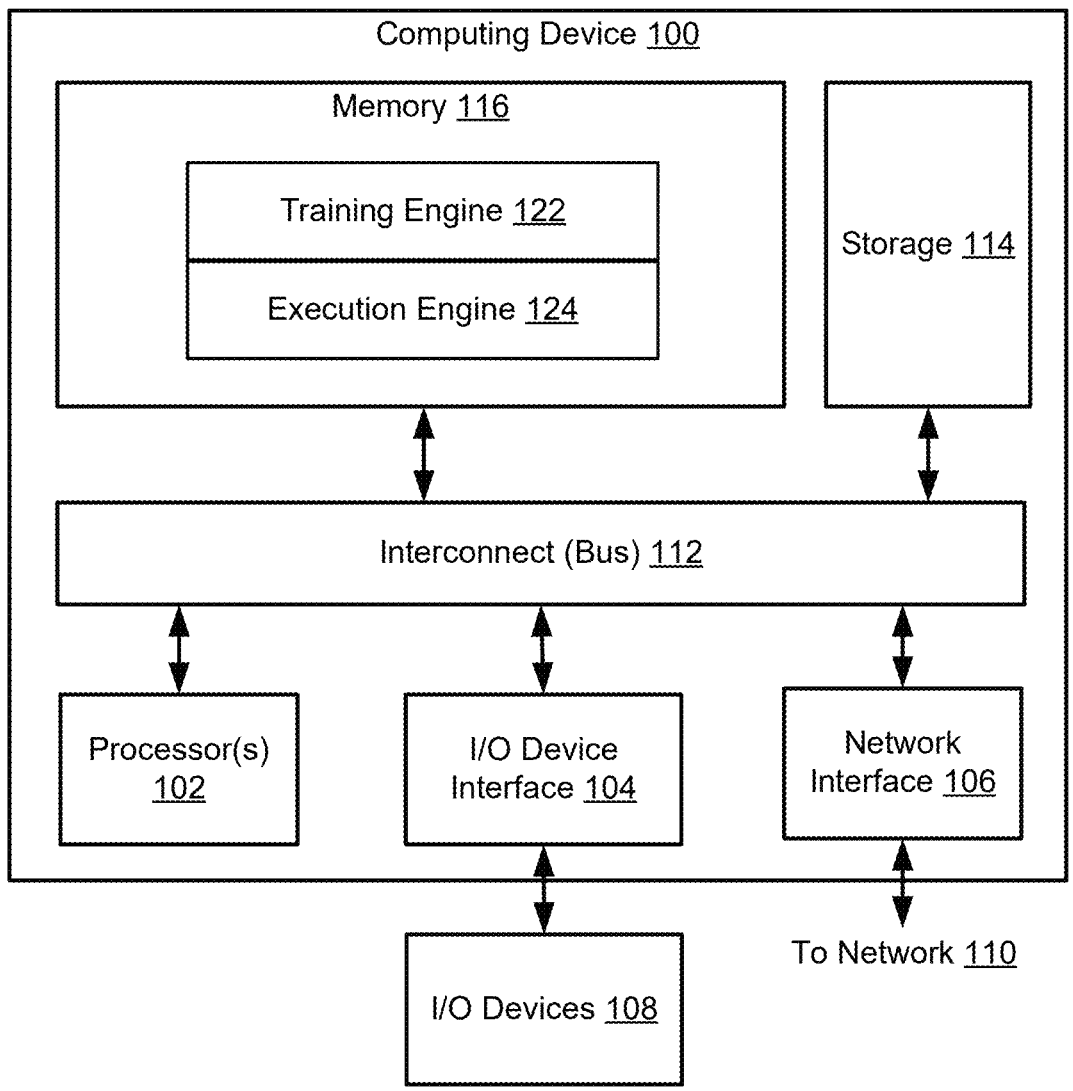
FIG. 1 illustrates a system configured to implement one or more aspects of various embodiments.

In the following description, numerous specific details are set forth to provide a more thorough understanding of the various embodiments. However, it will be apparent to one of skill in the art that the inventive concepts may be practiced without one or more of these specific details.

Overview

As discussed above, machine learning models that use text-based descriptions to guide image editing tasks can generate output images that conform to the text-based descriptions but fail to capture visual attributes desired by users providing the text-based descriptions. Consequently, a machine learning model can be executed multiple times to generate multiple output images from the same text-based description and/or different text-based descriptions until one or more of the output images depict visual attributes that match the preferences or expectations of a user.

To streamline the use of machine learning models in image editing tasks, the disclosed techniques use a machine learning model to perform targeted generative visual editing of images. Input into the machine learning model accepts includes a driver image that depicts a first set of visual attributes, as well as a source image that depicts a second set of visual attributes and includes a masked region to be blended with the driver image. In response to the input, the machine learning model generates an output image that depicts the second set of visual attributes and context of the source image outside of the region. The output image also replaces the second set of visual attributes within the region with the first set of visual attributes from the driver image while maintaining the context of the source image within the region. For example, the source image could depict a model wearing a dress, the masked region in the source image could include a lower portion of the dress, and the driver image could include a patch of material from another garment. Given this input, the machine learning model would generate an output image that shows the model wearing the dress, with the lower portion of the dress replaced with the material from the other garment.

Training data for the machine learning model includes a set of training output images, regions defined within the training output images, and training driver images that are generated by applying transformations to the regions of the corresponding training output images. The machine learning model is trained to generate the training output images, given input that includes the training driver images and portions of the training output images that lie outside the regions. For example, a region within a training output image could be defined using a bounding box and/or a semantic segmentation of the training output image. The region could also be removed from the training output image to generate a training source image. A driver image could be generated as a crop of the region, where the position and size of the crop is randomized. The training source image and the training driver image could be inputted into the machine learning model, and the parameters of the machine learning model could be updated in a way that reduces one or more losses between a representation of an output image generated by the machine learning model from the input and a representation of the corresponding training output image. The machine learning model would thus learn to transfer visual attributes from the driver image to the missing region in the source image while maintaining the spatial or semantic context from the training output image in all parts of the output image.

System Overview

FIG. 1 illustrates a computing device 100 configured to implement one or more aspects of various embodiments. In one embodiment, computing device 100 may be a desktop computer, a laptop computer, a smart phone, a personal digital assistant (PDA), a tablet computer, a server, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 and execution engine 124 operate to train and execute a machine learning model to perform targeted generative visual editing of images. As described in further detail below, targeted generative visual editing uses visual content depicted in a driver image as a guide for modifying a region of a source image.

To train the machine learning model, training engine 122 generates training driver images by applying transformations to regions defined within a set of training output images. Training engine 122 also trains the machine learning model to generate the training output images, given input that includes the training driver images and portions of the training output images that lie outside the regions. For example, a region within a training output image could be defined using a bounding box and/or a semantic segmentation of the training output image. Training engine 122 could remove the region from the training output image to generate a training source image. A driver image could be generated as a crop of the region, where the position and size of the crop is randomized. Training engine 122 could input the training source image and the training driver image into the machine learning model. Training engine 122 could also update the parameters of the machine learning model in a way that reduces one or more losses between a representation of an output image generated by the machine learning model from the input and a representation of the corresponding training output image. The machine learning model would thus learn to transfer visual attributes from the driver image to the region within the output image while maintaining the spatial or semantic context from the training output image within all parts of the output image.

Execution engine 124 uses the trained machine learning model to perform targeted generative visual editing using additional source images and/or driver images. First, execution engine inputs a given driver image and a source image with a masked region to be blended with the driver image into the machine learning model. In response to the input, the machine learning model generates an output image that depicts the visual attributes and context of the source image outside of the region and the visual attributes of the driver image and the context of the source image within the region. For example, the source image could depict a model wearing a dress, the masked region in the source image could include a lower portion of the dress, and the driver image could include a patch of material from another garment. Given this input, the machine learning model would generate an output image that shows the model wearing the dress, with the lower portion of the dress replaced with the material from the other garment.

Targeted Generative Visual Editing of Images

Figure 2:
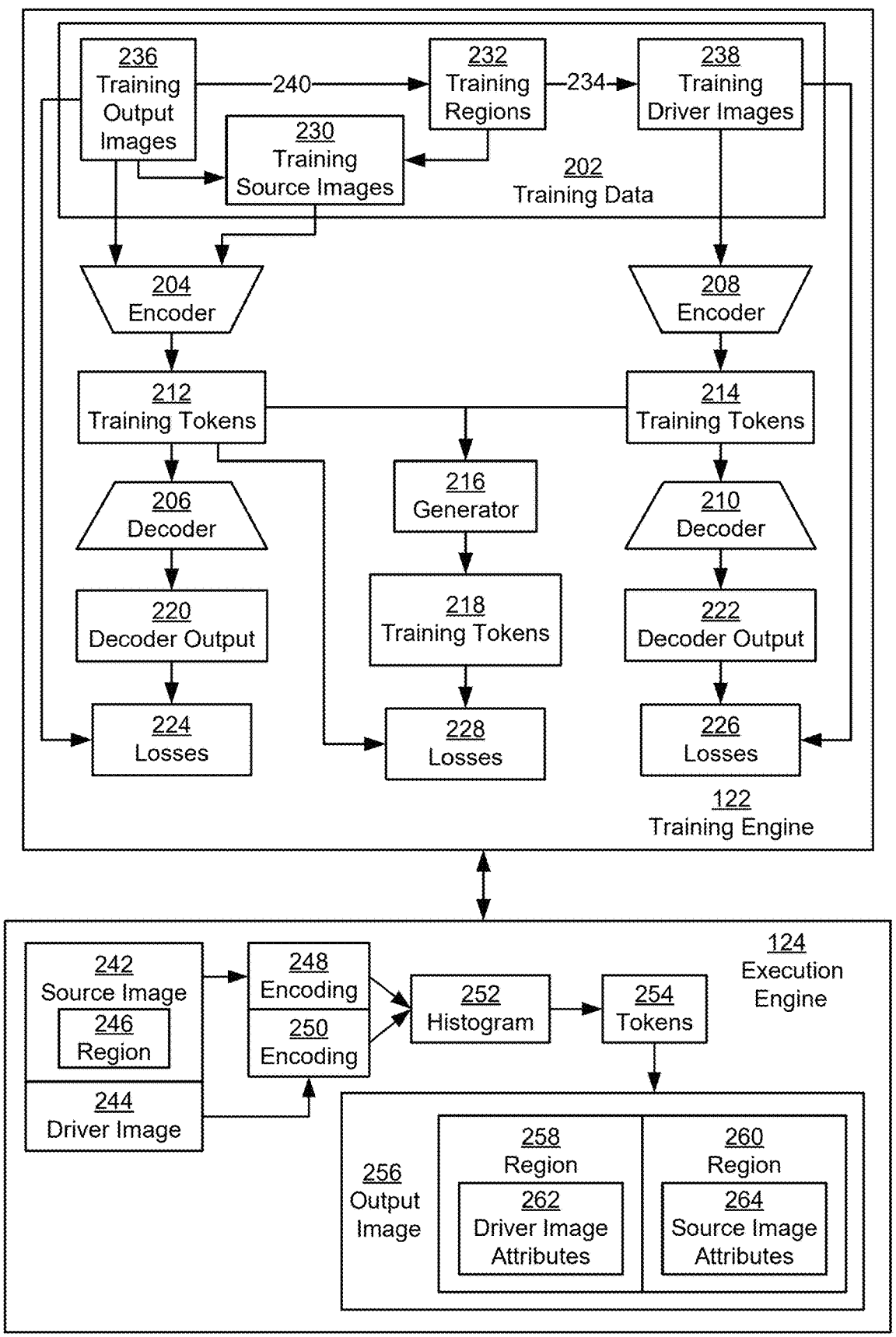
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a machine learning model to perform targeted generative visual editing of images, in which an output image 256 is generated as a variant of a source image 242 based on a driver image 244.

As shown in FIG. 2, source image 242 includes a region 246 to be blended with driver image 244. Source image 242, a representation of region 246, and driver image 244 are inputted into the machine learning model, and the machine learning model is executed to generate a corresponding output image 256. Output image 256 includes a first region 258 that spatially corresponds to region 246 in source image 242 and a second region 260 that spatially corresponds to the portion of source image 242 that lies outside of region 246. Region 258 includes driver image attributes 262 from driver image 244 and the context associated with source image 242, and region 260 includes source image attributes 264 from source image 242 and the context associated with source image 242.

In some embodiments, the context of a given image includes an object depicted in the image, a setting associated with the image, a geometric or spatial arrangement of shapes or objects within the image, and/or another semantic component of the image. For example, the context of an image depicting a face could include a recognizable arrangement of eyes, ears, nose, mouth, and/or other lines, polygons, objects, or shapes. In another example, the context of an image depicting a garment worn by a model could include a recognizable arrangement of body parts from the model and/or a recognizable shape or appearance of the garment.

Visual attributes of a given image include colors, patterns, styles, edges, lines, and/or other attributes that define the manner in which objects in the image are depicted. For example, visual attributes of an image depicting a face could include a hairstyle, hair color, jewelry, glasses, eye color, facial expression, and/or other characteristics that can be used to define or identify a particular face. In another example, visual attributes of an image depicting a garment worn by a model could include the texture, pattern, color, style, and/or other attributes of the fabric or material used in the garment.

Consequently, a given output image 256 that includes the context associated with a corresponding source image 242 can depict objects, settings, and/or geometric or spatial arrangements of shapes or objects from that source image 242. Region 260 in output image 256 can include colors, patterns, styles, edges, lines, and/or other visual source image attributes 264 from the same source image 242, while region 258 in output image can include colors, patterns, styles, edges, lines, and/or other visual driver image attributes 262 from driver image 244. For example, source image 242 could depict a model wearing a dress, region 246 could include a portion of the dress, and driver image 244 could include a patch of material from a different garment. Output image 256 could thus depict the model wearing the same dress but with the material of the dress within region 246 replaced with the material from the patch depicted in driver image 244.

In one or more embodiments, the targeted visual editing performed by the machine learning model is represented by a conditional probability distribution $P(\hat{x}|x,y,R)$, where $x \in \mathbb{R}^{3 \times H \times W}$ represents source image 242, $\hat{x} \in \mathbb{R}^{3 \times H \times W}$ represents output image 256, $y \in \mathbb{R}^{3 \times H' \times W'}$ represents driver image 244, and H>H' and W>W' (i.e., the height and width of source image 242 typically exceed the height and width of driver image 244). Region 246 in source image 242 can be represented as a binary mask $R \in \{0,1\}^{H \times W}$, which is combined with source image 242 to generate a masked source image 242 represented by $(1-R) \odot x$.

As shown in FIG. 2, the machine learning model includes a first encoder 204 and a first decoder 206 that form a first autoencoder, a second encoder 208 and a second decoder 210 that form a second autoencoder, and a generator 216. Each of encoder 204, decoder 206, encoder 208, decoder 210, and/or generator 216 includes a series of neural network layers that process one or more inputs and generate one or more corresponding outputs.

In one or more embodiments, the machine learning model includes an autoregressive model that implements a conditional distribution $P(\hat{x}|c)$, where c represents all conditioning information. The autoregressive model decomposes a given output image 256 $\hat{x}$ into M components (i.e., $\hat{x}=(\hat{x}_1, \ldots, \hat{x}_M)$) and factorizes the conditional distribution as a product $P(\hat{x}|c)=\Pi_{m=1}^{M} P(\hat{x}_m|\hat{x}_1, \ldots, \hat{x}_{m-1},c)$. The autoregressive model additionally includes two separate stages. The first stage includes the first autoencoder formed from encoder 204 and decoder 206, as well as the second autoencoder formed from encoder 208 and decoder 210. The second stage includes generator 216.

Training engine 122 trains the autoregressive model to learn the conditional probability distribution $P(\hat{x}|x,y,R)$. First, training engine 122 pretrains each of the two encoders 204 and 208 in the first stage of the autoregressive model to learn a compressed and discretized representation $z=\Phi(\hat{x}) \in \{1, \ldots, K\}^M$ of a corresponding set of images. Each encoder 204 and 208 is also paired with a corresponding decoder 206 and 210, respectively, that learns to reconstruct an image from the corresponding discretized representation (i.e., $\hat{x}=\Phi(z)$). After pretraining of encoders 204 and 208 and decoders 206 and 210 is complete, training engine 122 trains generator 216 in the second stage of the autoregressive model to model the factors in the factorized conditional distribution $P(\hat{E}_m|\hat{x}_1, \ldots, \hat{x}_{m-1}, c)$.

In some embodiments, training data 202 used to train the autoregressive model includes a set of training output images 236, a set of training source images 230 that are generated by removing a set of training regions 232 from the training output images 236, and a set of training driver images 238 that are generated from training regions 232. Training output images 236 include "full" images (i.e., images that do not include missing or replaced regions) that depict various types of content. For example, training output images 236 could include images garments, faces, rooms, and/or other types of content or settings. Each training output image $\hat{x}$ in the set of training output images 236 is used as a ground truth for the output of the autoregressive model. This ground truth training output image is used with one or more training regions 232 to generate one or more corresponding training source images 230 and one or more corresponding training driver images 238.

Training regions 232 include portions of training output images 236 that are generated via various edits 240 to training output images 236. For example, each training region R in the set of training regions 232 could be specified as a square and/or rectangular bounding box within a corresponding training output image x. The bounding boxes could be randomly sampled from various parts of training output images 236 and include dimensions that meet certain requirements (e.g., a minimum and/or maximum height and/or width). In another example, training regions 232 could include one or more regions that are obtained via semantic segmentation of training output images 236. Thus, a training output image $\hat{x}$ that depicts a model wearing a dress could include a training region R that corresponds to the portion of the training output image that is occupied by the dress. In a third example, training regions 232 could regions that are randomly selected or specified by users, regions with randomized shapes and/or sizes, and/or other types of arbitrarily defined regions within training output images 236.

Training output images 236 can be combined with masks of the corresponding training regions 232 to generate training source images 230 that depict content in training output images 236 outside of training regions 232. For example, each training source image in the set of training source images 230 could be represented by $x=(1-R)\odot\hat{x}$.

Training driver images 238 are generated by applying randomized transformations 234 to image content within training regions 232. For example, each training driver image in the set of training driver images 238 could be represented by $y=T(R\odot\hat{x})$. The transformation $T: \mathbb{R}^{3\times H\times W} \to \mathbb{R}^{3\times H'\times W'}$ could be obtained as a crop $R_T$ of a training region R within a corresponding training source image, where the position and size of the crop are randomized. As discussed in further detail below, this randomization of transformations 234 allows for decorrelation of spatial continuity or geometric arrangement between training source images 230 and the corresponding training driver images 238, which allows the autoregressive model to learn to fill in training regions 232 with visual attributes from training driver images 238 while maintaining the semantic context of the corresponding training source images 230.

In other words, training data 202 is generated by defining training regions 232, training driver images 238, and training source images 230 with respect to training output images 236. This allows the autoregressive model to learn the conditional probability distribution $P(\hat{x}|x,y,R)$ from a large set of training output images 236 and does not require training data 202 to be manually generated by artists and/or designers.

In some embodiments, each of the two autoencoders (e.g., the first autoencoder that includes encoder 204 and decoder 206 and the second autoencoder that includes encoder 208 and decoder 210) in the first stage of the autoregressive model corresponds to a vector quantized variational autoencoder (VQVAE). A discriminator neural network (not shown) can be used to convert the VQVAE into a vector quantized generative adversarial network (VQGAN).

During pretraining of the first stage of the autoregressive model, training engine 122 trains each VQVAE (or VQGAN) to learn a codebook corresponding to the compressed and discretized representation $z=\Phi(\hat{x})\in\{1,\ldots,K\}^M$ of a corresponding set of images. Within the codebook, K represents the size of the discrete encoding space, and M represents the number of discrete tokens used to represent the set of images (e.g., the number of training tokens 212 for the first VQVAE or the number of training tokens 214 for the second VQVAE).

More specifically, training engine 122 inputs training output images 236 into encoder 204. Encoder 204 converts each inputted image into a sequence of encoded outputs, and each encoded output is quantized into the closest entry in the codebook associated with encoder 204 and decoder 206. The quantized outputs are used as training tokens 212 that are inputted into decoder 206. In response to the inputted training tokens 212, decoder 206 generates decoder output 220 corresponding to a reconstruction of the training output image. Training engine 122 computes one or more losses 224 between decoder output 220 and the training output image and updates parameters of encoder 204 and decoder 206 based on losses 224.

Training engine 122 similarly inputs training driver images 238 into encoder 208. Encoder 208 converts each inputted image into a sequence of encoded outputs, and each encoded output is quantized into the closest entry in the codebook associated with encoder 208 and decoder 210. The quantized outputs are used as training tokens 214 that are inputted into decoder 210. In response to the inputted training tokens 214, decoder 210 generates decoder output 222 corresponding to a reconstruction of the training driver image. Training engine 122 computes one or more losses 226 between decoder output 222 and the training driver image and updates parameters of encoder 208 and decoder 210 based on losses 226.

Figure 3B:
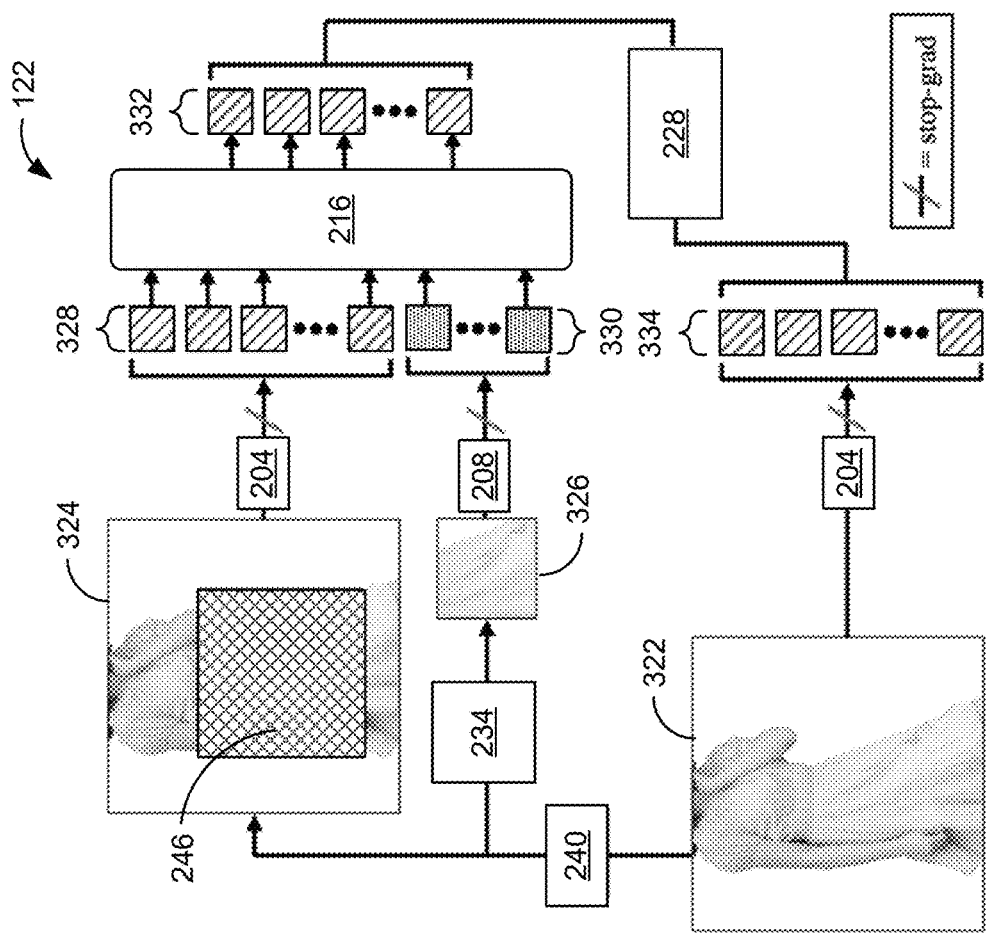
FIG. 3B illustrates the training of the generator of FIG. 2, according to various embodiments.
Figure 3A:
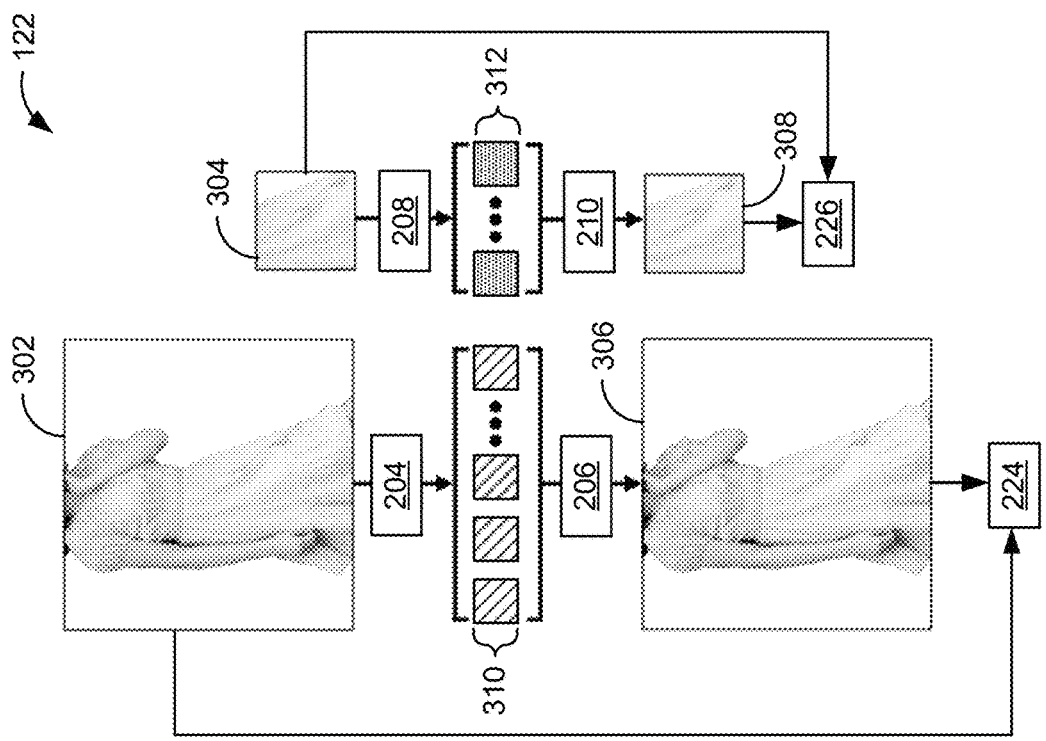
FIG. 3A illustrates the pretraining of the encoders and decoders of FIG. 2, according to various embodiments.

FIG. 3A illustrates the pretraining of encoders 204 and 208 and decoders 206 and 210 of FIG. 2, according to various embodiments. As shown in FIG. 3A, training engine 122 retrieves, from the set of training output images 236, a training output image 302 that depicts a model wearing a dress. Training engine 122 inputs training output image 302 into encoder 204, and encoder 204 converts training output image 302 into a corresponding set of tokens 310 (e.g., a set of training tokens 212). Training engine 122 inputs tokens 310 into decoder 206, and decoder 206 converts tokens 310 into a reconstruction 306 of training output image 302. Training engine 122 then computes one or more losses 224 using training output image 302 and reconstruction 306. Training engine 122 also uses a training technique (e.g., gradient descent and backpropagation) to update parameters of encoder 204 and decoder based on the computed losses 224.

Training engine 122 separately inputs a training driver image 304 associated with training output image 302 into encoder 208. As described above, training driver image 304 is generated from a region within training output image 302. For example, training driver image 304 could include a randomized crop of a rectangular and/or arbitrarily defined region in training output image 302.

In response to the inputted training driver image 304, encoder 208 outputs a set of tokens 312 (e.g., a set of training tokens 214). Training engine 122 inputs tokens 312 into decoder 210, and decoder 210 converts tokens 312 into a reconstruction 308 of training driver image 304. Training engine 122 then computes one or more losses 226 using training driver image 304 and reconstruction 308. Training engine 122 also uses a training technique (e.g., gradient descent and backpropagation) to update parameters of encoder 204 and decoder based on the computed losses 226.

As mentioned above, encoder 204 and decoder 206 form a first VQVAE (or VQGAN), and encoder 208 and decoder 210 form a second VQVAE (or VQGAN). Each VQVAE (or VQGAN) includes a convolutional neural network that represents images using codes from a learned, discrete codebook z. Losses 224 and 226 used to train the VQVAEs can include a reconstruction loss that is computed between an image (e.g., training output image 302 or training driver image 304) inputted into a given encoder (e.g., encoder 204 or 208) and a reconstruction of the image (e.g., reconstruction 306 or 308) produced by the corresponding decoder (e.g., decoder 206 or 210), a codebook loss that shifts discrete embedding vectors in the codebook toward the output generated by the encoder, and/or a commitment loss that ensures that the encoder commits to an embedding in the codebook. When each encoder-decoder pair corresponds to a VQGAN, losses 224 and 226 also include a perceptual loss associated with a patch discriminator (not shown) that aims to differentiate between real and reconstructed images.

Returning to the discussion of FIG. 2, after pretraining of encoder 204, decoder 206, encoder 208, and decoder 210 is complete, training engine 122 trains generator 216 in the second stage of the autoregressive model. In some embodiments, generator 216 includes an autoregressive transformer that models the factors in the factorized conditional distribution $P(\hat{x}_m|\hat{x}_1, \ldots, \hat{x}_{m-1},c)$, where the conditioning information c=(x,y,R) includes a given source image 242 x, a given driver image 244 y, and a given region 246 R within source image 242 and the factors require each predicted token to depend only on prior tokens in the sequence of tokens outputted by the autoregressive transformer. For example, generator 216 could include a generative pretrained transformer (GPT) architecture that uses causal masking to enforce unidirectional attention toward earlier tokens in the sequence.

To train generator 216, training engine 122 inputs a sequence of tokens $S_m=(z_1, \ldots, z_m)\oplus\Phi(x)\oplus\Phi(y)$, which includes any partially predicted output tokens along with conditioning tokens representing the conditioning information (e.g., training tokens 212 generated by encoder 204 from a training source image and training tokens 214 generated by encoder 208 from a training driver image), into generator 216. The inputted tokens include compressed representations of the training source image and training driver image and allow generator 216 to scale to higher resolution images.

Because the inputted tokens include discrete latent representations of the corresponding images, generator 216 is also able to predict discrete distributions of the latent representations from the inputted tokens. In particular, generator 216 converts the inputted tokens into a K-dimensional histogram $P(z_m=\cdot|S_m)$, which is sampled by training engine 122 to obtain token values in training tokens 218. Training engine 122 also computes one or more losses 228 between training tokens 218 and a set of training tokens 212 generated by encoder 204 from a training output image and updates parameters of generator 216 based on losses 228.

FIG. 3B illustrates the training of generator 216 of FIG. 2, according to various embodiments. As shown in FIG. 3B, training engine 122 retrieves a training output image 322 that depicts a model wearing a dress from the set of training output images 236.

Training engine 122 performs one or more edits 240 that remove a region 246 from training output image 322 to produce a training source image 324. Because region 246 can be inferred from the corresponding "hole" in training source image 324, no additional encoding of region 246 is required. Training engine 122 also uses one or more transformations 234 to generate a training driver image 326 as a randomized crop of visual content within region 246.

Training engine 122 inputs training output image 322 into the pretrained encoder 204 and uses encoder 204 to generate a corresponding sequence of tokens 334 (e.g., as a set of training tokens 212). Training engine 122 also inputs training driver image 326 into the pretrained encoder 208 and uses encoder 208 to generate a corresponding sequence of tokens 330 (e.g., as a set of training tokens 214). Training engine 122 further inputs training source image 324 into the pretrained encoder 204 and uses encoder 204 to generate a corresponding sequence of tokens 328 (e.g., as another set of training tokens 214).

Next, training engine 122 concatenates tokens 328 and 330 and inputs the concatenated tokens into generator 216. Training engine 122 obtains a sequence of tokens 332 (e.g., as a set of training tokens 218) as output of generator 216 and computes one or more losses 228 between tokens 332 and tokens 334. Training engine 122 then uses a training technique (e.g., gradient descent and backpropagation) to update parameters of generator 216 based on losses 228 but does not further train encoders 204 and 208 based on losses 228. For example, training engine 122 could use teacher forcing to train all factors modeled by generator 216 in parallel without further training encoders 204 and 208.

In some embodiments, training engine 122 trains generator 216 using a negative log-likelihood loss:

$$\theta^* = \underset{\theta}{\mathrm{argmin}}\left(-\frac{1}{|\mathcal{T}|}\sum_{(\hat{x},x,y,R)\in\mathcal{T}} \log P_\theta(\hat{x}|x, y, R)\right) \quad (1)$$

In the above equation, $P_\theta(\hat{x}|x,y,R)$ represents generator 216, and $\mathcal{T}$ represents training data 202 that includes quadruplets of training output images $\hat{x}$, training source images 230 x, training driver images 238 y, and training regions 232 R.

Returning to the discussion of FIG. 2, after both stages of the autoregressive model have been trained by training engine 122, execution engine 124 uses one or more components of the autoregressive model to perform targeted editing that blends a given region 246 R of a new source image 242 x with a new driver image 244 y. As with training regions 232 associated with training output images 236, region 246 can include a bounding box, semantic segmentation, an arbitrarily defined region, and/or another region of contiguous pixel locations within source image 242. After region 246 is specified, execution engine 124 combines region 246 and source image 242 into a masked source image 242 represented by (1−R)⊙x. Execution engine 124 also uses encoder 204 to convert the masked source image 242 into a first encoding 248 and uses encoder 208 to convert driver image 244 into a second encoding 250. For example, execution engine 124 could use encoder 204 to convert the masked source image 242 into a first set of quantized tokens. Execution engine 124 could additionally use encoder 208 to convert driver image 244 into a second set of quantized tokens.

Execution engine 124 inputs encodings 248-250 into generator 216 and obtains a histogram 252 of token values as output of generator 216. Execution engine 124 additionally samples from histogram 252 to determine a set of tokens 254 associated with output image 256 and and uses decoder 206 to convert the sampled tokens 254 into output image 256. As mentioned above, output image 256 includes a first region 258 that spatially corresponds to region 246 in source image 242 and includes driver image attributes 262 from driver image 244, as well as a second region 260 that spatially corresponds to the remainder of source image 242 outside of region 246 and includes source image attributes 264 of source image 242. Both regions 258-260 of output image 256 maintain the context depicted in source image 242.

Figure 3C:
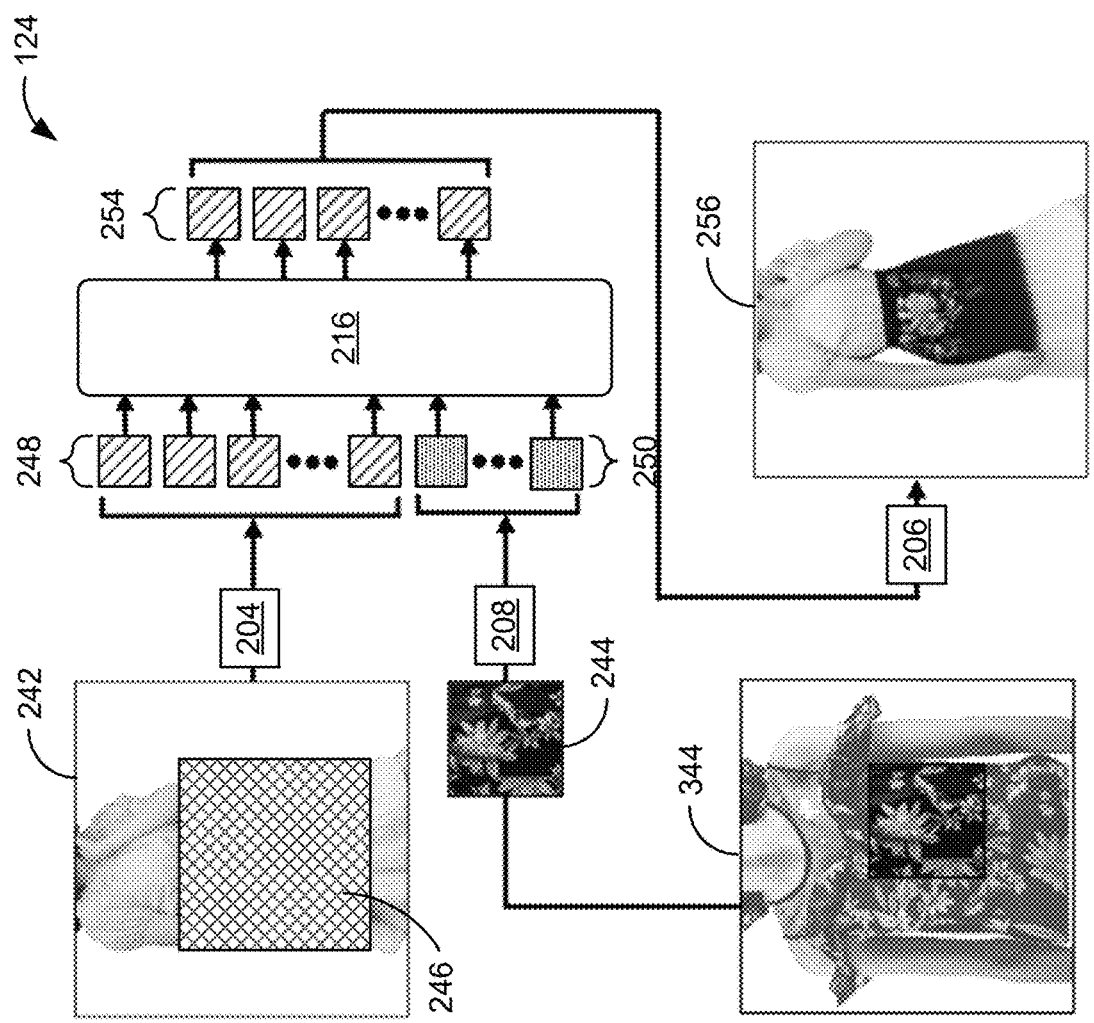
FIG. 3C illustrates the generation of an output image from a source image and a driver image, according to various embodiments.

FIG. 3C illustrates the generation of output image 256 from source image 242 and driver image 244, according to various embodiments. Source image 242 depicts a model wearing a dress and includes a removed region 246. Driver image 244 includes a region of another image 344 that depicts a different model wearing a different dress. As shown in FIG. 3C, driver image includes visual attributes (e.g., colors, patterns, textures, etc.) of a "patch" of material in the dress depicted in image 344.

Execution engine 124 inputs source image 242 into encoder 204 and obtains a set of quantized tokens corresponding to encoding 248 as output of encoder 204. Execution engine 124 also inputs driver image 244 into encoder 208 and obtains a set of quantized tokens corresponding to encoding 250 as output of encoder 208. Execution engine 124 inputs a concatenation of the two sets of quantized tokens into generator 216 and generates a set of output tokens 254 by sampling from a multidimensional histogram 252 (not shown in FIG. 3C) outputted by generator 216. More specifically, execution engine 124 uses generator 216 to predict a discrete distribution of token values for a given token position in the set of tokens 254 based on token values sampled for previous token positions in the set of tokens 254.

Execution engine 124 then uses decoder 206 to convert tokens 254 into output image 256. As shown in FIG. 3C, output image 256 depicts the model wearing the dress from source image 242 outside of region 246 but replaces the portion of the dress that lies inside region 246 with a corresponding portion that includes visual attributes (e.g., color, floral patterns, material, etc.) of driver image 244. Output image 256 additionally incorporates visual attributes of driver image 244 into the context associated with source image 242 in a cohesive manner (e.g., so that the material/patterning shown in driver image 244 is incorporated into the overall shape and/or style of the dress) instead of simply depicting a "pasting" of driver image 244 into region 246 of source image 242.

While the operation of training engine 122 and execution engine 124 has been described above with respect to a two-stage autoregressive model that includes encoder 204, decoder 206, encoder 208, decoder 210, and generator 216, it will be appreciated that training engine 122 and execution engine 124 can be used to train and execute a variety of machine learning components and architectures to perform targeted generative visual editing of images. For example, training engine 122 could use training data 202 with various losses and/or training stages to train one or more convolutional neural networks, transformer neural networks, autoencoders, generative adversarial networks, autoregressive models, bidirectional attention models, and/or other types of machine learning models. Execution engine 124 could then use one or more components of the machine learning models to convert input that includes source image 242, driver image 244, and region 246 into output image 256.

Figure 4:
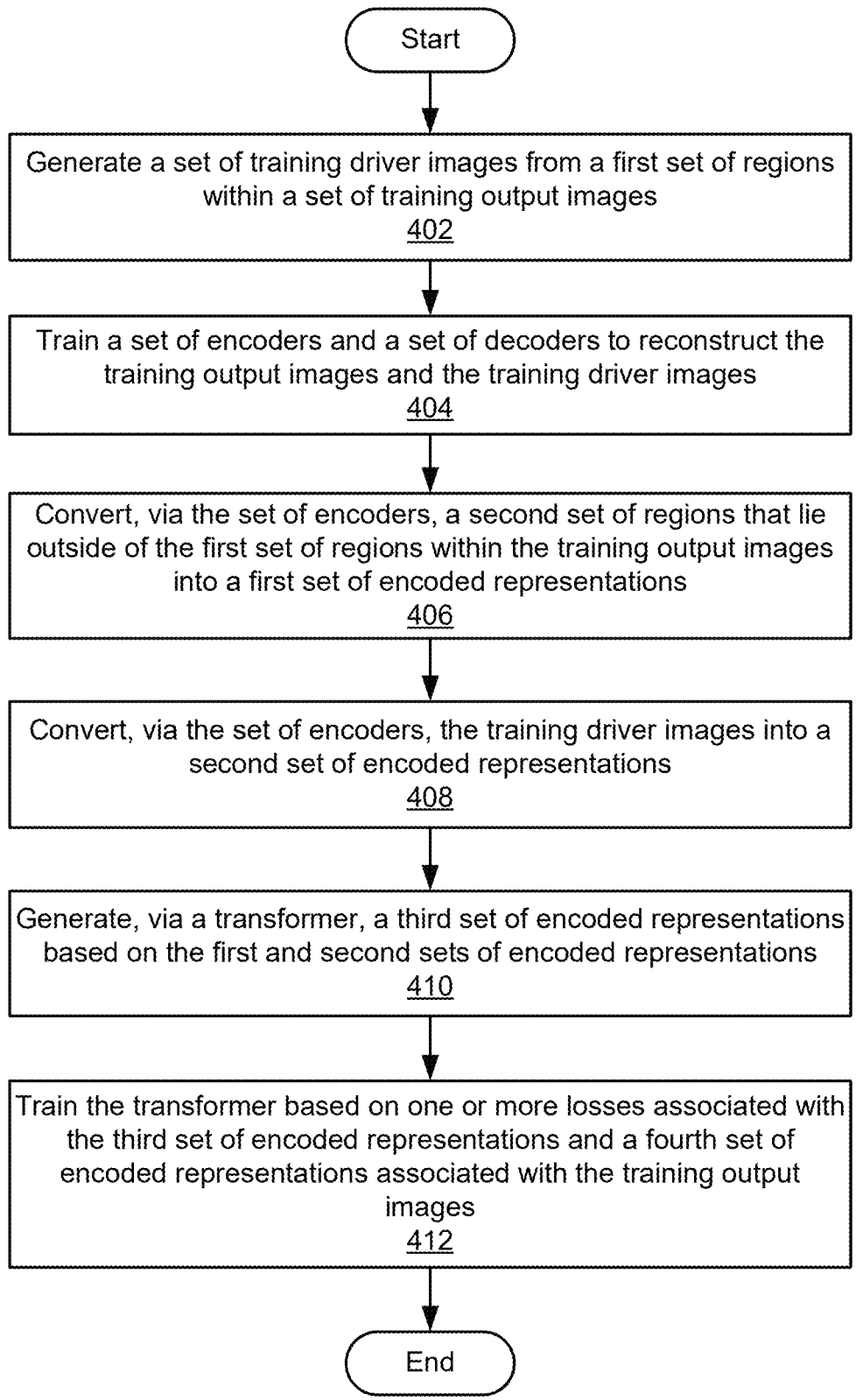
FIG. 4 is a flow diagram of method steps for training a neural network to perform targeted generative visual editing, according to various embodiments.

FIG. 4 is a flow diagram of method steps for training a neural network to perform targeted generative visual editing, according to various embodiments. Although the method steps are described in conjunction with the systems of FIGS. 1-2, persons skilled in the art will understand that any system configured to perform the method steps in any order falls within the scope of the present disclosure.

As shown, in step 402, training engine 122 generates a set of training driver images from a first set of regions within a set of training output images. For example, training engine 122 could obtain the training output images as images depicting faces, models wearing garments, interiors of buildings, and/or other types of content. Training engine 122 could determine a region within each training output image as a square or rectangular bounding box, a semantic segmentation of an object in the training output image, and/or a region of arbitrary shape or size. Training engine 122 could then generate a driver image as an additional crop or sub-region within the region.

In step 404, training engine 122 trains a set of encoders and a set of decoders to reconstruct the training output images and the training driver images. For example, training engine 122 could train a first VQVAE, VQGAN, or another type of autoencoder that includes a first encoder and a first decoder to reconstruct the training output images. Training engine 122 could also train a second VQVAE, VQGAN, or another type of autoencoder that includes a second encoder and a second decoder to reconstruct the training driver images. Each encoder-decoder pair would learn a compressed and/or discrete latent representation of the corresponding set of images.

In step 406, training engine 122 converts, via the set of encoders, a second set of regions that lie outside of the first set of regions within the training output images into a first set of encoded representations. In step 408, training engine 122 converts, via the set of encoders, the training driver images into a second set of encoded representations. Continuing with the above example, training engine 122 could use the first encoder to convert a masked training output image that excludes a region of a training output image from which a corresponding training driver image was generated into a first set of discrete tokens. Training engine 122 could also use the second encoder to convert the training driver image into a second set of discrete tokens.

In step 410, training engine 122 generates, via a transformer, a third set of encoded representations based on the first and second sets of encoded representations. Continuing with the above example, training engine 122 could sample a third set of discrete tokens from a series of histograms outputted by the transformer based on the first and second sets of discrete tokens. After training engine 122 samples a token value for a given token position from the corresponding histogram, training engine 122 inputs all previously sampled token values with the first and second sets of discrete tokens into the transformer and obtains a histogram for the next token position as output of the transformer.

In step 412, training engine 122 trains the transformer based on one or more losses associated with the third set of encoded representations and a fourth set of encoded representations associated with the training output images. Continuing with the above example, training engine 122 could use the first encoder to convert the training output image into a fourth set of discrete tokens. Training engine 122 could also compute a negative log-likelihood loss and/or another measure of error between the fourth set of discrete tokens and the third set of discrete tokens and use the measure of error with teacher forcing to train all factors modeled by the transformer in parallel.

Figure 5:
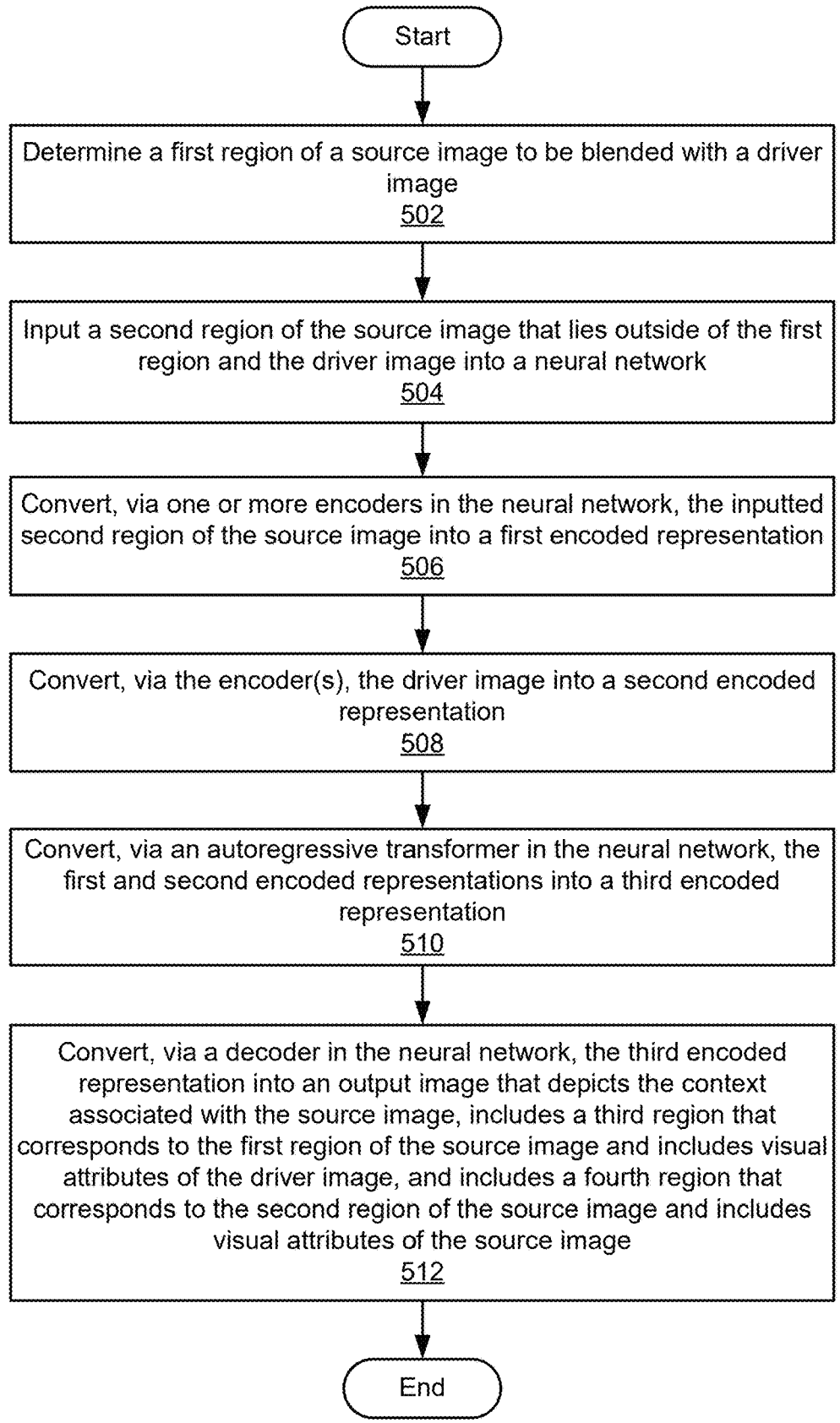
FIG. 5 is a flow diagram of method steps for combining a source image and a driver image, according to various embodiments.

FIG. 5 is a flow diagram of method steps for combining a source image and a driver image, according to various embodiments. Although the method steps are described in conjunction with the systems of FIGS. 1-2, persons skilled in the art will understand that any system configured to perform the method steps in any order falls within the scope of the present disclosure.

As shown, in step 502, execution engine 124 determines a first region of a source image to be blended with a driver image. For example, execution engine 124 could receive the first region as a bounding box, semantic segmentation, and/or arbitrarily defined region within the source image from a user.

In step 504, execution engine 124 inputs a second region of the source image that lies outside of the first region and the driver image into a neural network. For example, execution engine 124 could generate a masked source image by removing the first region from the source image. Execution engine 124 could also input the masked source image into a first encoder and the driver image into a second encoder.

In step 506, execution engine 124 converts, via one or more encoders in the neural network, the inputted second region of the source image into a first encoded representation. In step 508, execution engine 124 converts, via the encoder(s), the driver image into a second encoded representation. Continuing with the above example, execution engine 124 could use the first encoder to convert the masked source image into a first set of discrete tokens and the second encoder to convert the driver image into a second set of discrete tokens.

In step 510, execution engine 124 converts, via an autoregressive transformer in the neural network, the first and second encoded representations into a third encoded representation. Continuing with the above example, execution engine 124 could iteratively sample a third set of discrete tokens from a series of histograms outputted by the transformer based on the first and second sets of discrete tokens. After execution engine 124 samples a token value for a given token position from the corresponding histogram, execution engine 124 could input a concatenation of all previously sampled token values with the first and second sets of discrete tokens into the transformer and obtain a histogram for the next token position as output of the transformer. Execution engine 124 could continue iteratively sampling from histograms outputted by the transformer until token values for all token positions have been sampled.

In step 512, execution engine 124 converts, via a decoder in the neural network, the third encoded representation into an output image that depicts the context associated with the source image, includes a third region that corresponds to the first region of the source image and includes visual attributes of the driver image, and includes a fourth region that corresponds to the second region of the source image and includes visual attributes of the source image. For example, the source image could depict a model wearing a dress, the first region in the source image could include a portion of the dress, and the driver image could depict a patch of material from a different garment and/or a portion of a different scene or setting. The third region of the output image could depict the model wearing the dress, and the fourth region of the output image could maintain the overall shape or look of the portion of the dress while incorporating visual attributes from material in the driver image into the portion of the dress.

In another example, the source image could depict a bedroom, the first region in the source image could include a portion of a wall in the bedroom, and the driver image could depict a portion of a window and a partial view from the window. The third region of the output image could depict the bedroom, and the fourth region of the output image could replace the portion of the wall with a window that includes the visual attributes of the partial view depicted in the driver image. The placement and orientation of the window could additionally be consistent with the spatial and/or geometric layout of the room and/or objects in the room.

In a third example, the source image could depict a first face, the first region in the source image could include a lower portion of the first face, and the driver image could depict facial hair from the second face. The third region of the output image could depict the first face, and the fourth region of the output image could replace the lower portion of the first face with a representation of the facial hair from the second face.

Artificial Reality System

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or near-eye display (NED) connected to a host computer system, a standalone HMD or NED, a mobile device or computing system, or any other hardware platform capable of providing artificial reality content to one or more viewers.

Figure 6:
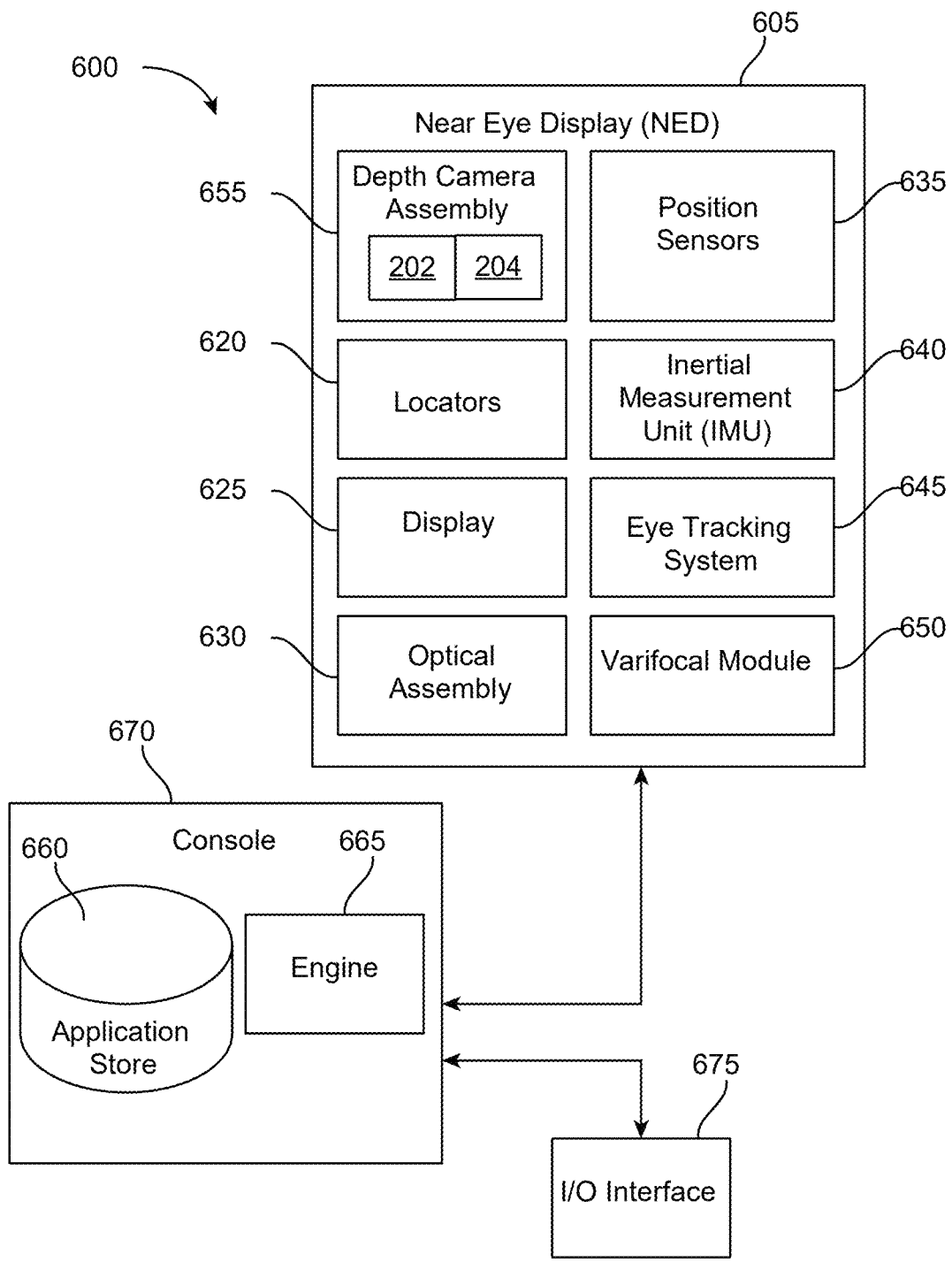
FIG. 6 is a block diagram of an embodiment of a near-eye display (NED) system in which a console operates, according to various embodiments.

FIG. 6 is a block diagram of an embodiment of a near-eye display (NED) system 600 in which a console operates, according to various embodiments. The NED system 600 may operate in a virtual reality (VR) system environment, an augmented reality (AR) system environment, a mixed reality (MR) system environment, or some combination thereof. The NED system 600 shown in FIG. 6 comprises a NED 605 and an input/output (I/O) interface 675 that is coupled to the console 670.

While FIG. 6 shows an example NED system 600 including one NED 605 and one I/O interface 675, in other embodiments any number of these components may be included in the NED system 600. For example, there may be multiple NEDs 605, and each NED 605 has an associated I/O interface 675. Each NED 605 and I/O interface 675 communicates with the console 670. In alternative configurations, different and/or additional components may be included in the NED system 600. Additionally, various components included within the NED 605, the console 670, and the I/O interface 675 may be distributed in a different manner than is described in conjunction with FIGS. 1-3B in some embodiments. For example, some or all of the functionality of the console 670 may be provided by the NED 605 and vice versa.

The NED 605 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 605 may also present audio content to a user. The NED 605 and/or the console 670 may transmit the audio content to an external device via the I/O interface 675. The external device may include various forms of speaker systems and/or headphones. In various embodiments, the audio content is synchronized with visual content being displayed by the NED 605.

The NED 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 6, the NED 605 may include a depth camera assembly (DCA) 655, one or more locators 620, a display 625, an optical assembly 630, one or more position sensors 635, an inertial measurement unit (IMU) 640, an eye tracking system 645, and a varifocal module 650. In some embodiments, the display 625 and the optical assembly 630 can be integrated together into a projection assembly. Various embodiments of the NED 605 may have additional, fewer, or different components than those listed above. Additionally, the functionality of each component may be partially or completely encompassed by the functionality of one or more other components in various embodiments.

The DCA 655 captures sensor data describing depth information of an area surrounding the NED 605. The sensor data may be generated by one or a combination of depth imaging techniques, such as triangulation, structured light imaging, time-of-flight imaging, stereo imaging, laser scan, and so forth. The DCA 655 can compute various depth properties of the area surrounding the NED 605 using the sensor data. Additionally or alternatively, the DCA 655 may transmit the sensor data to the console 670 for processing. Further, in various embodiments, the DCA 655 captures or samples sensor data at different times. For example, the DCA 655 could sample sensor data at different times within a time window to obtain sensor data along a time dimension.

The DCA 655 includes an illumination source, an imaging device, and a controller. The illumination source emits light onto an area surrounding the NED 605. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device includes camera sensors that capture ambient light in the environment surrounding NED 605, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 620 are objects located in specific positions on the NED 605 relative to one another and relative to a specific reference point on the NED 605. A locator 620 may be a light emitting diode (LED), a corner cube reflector, a reflective marker, a type of light source that contrasts with an environment in which the NED 605 operates, or some combination thereof. In embodiments where the locators 620 are active (i.e., an LED or other type of light emitting device), the locators 620 may emit light in the visible band (~360 nm to 750 nm), in the infrared (IR) band (~750 nm to 7700 nm), in the ultraviolet band (70 nm to 360 nm), some other portion of the electromagnetic spectrum, or some combination thereof.

In some embodiments, the locators 620 are located beneath an outer surface of the NED 605, which is transparent to the wavelengths of light emitted or reflected by the locators 620 or is thin enough not to substantially attenuate the wavelengths of light emitted or reflected by the locators 620. Additionally, in some embodiments, the outer surface or other portions of the NED 605 are opaque in the visible band of wavelengths of light. Thus, the locators 620 may emit light in the IR band under an outer surface that is transparent in the IR band but opaque in the visible band.

The display 625 displays two-dimensional or three-dimensional images to the user in accordance with pixel data received from the console 670 and/or one or more other sources. In various embodiments, the display 625 comprises a single display or multiple displays (e.g., separate displays for each eye of a user). In some embodiments, the display 625 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 625 and used separately, in parallel, and/or in combination.

The optical assembly 630 magnifies image light received from the display 625, corrects optical errors associated with the image light, and presents the corrected image light to a user of the NED 605. The optical assembly 630 includes a plurality of optical elements. For example, one or more of the following optical elements may be included in the optical assembly 630: an aperture, a Fresnel lens, a convex lens, a concave lens, a filter, a reflecting surface, or any other suitable optical element that deflects, reflects, refracts, and/or in some way alters image light. Moreover, the optical assembly 630 may include combinations of different optical elements. In some embodiments, one or more of the optical elements in the optical assembly 630 may have one or more coatings, such as partially reflective or antireflective coatings.

In some embodiments, the optical assembly 630 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 625 is pre-distorted, and the optical assembly 630 corrects the distortion as image light from the display 625 passes through various optical elements of the optical assembly 630. In some embodiments, optical elements of the optical assembly 630 are integrated into the display 625 as a projection assembly that includes at least one waveguide coupled with one or more optical elements.

The IMU 640 is an electronic device that generates data indicating a position of the NED 605 based on measurement signals received from one or more of the position sensors 635 and from depth information received from the DCA 655. In some embodiments of the NED 605, the IMU 640 may be a dedicated hardware component. In other embodiments, the IMU 640 may be a software component implemented in one or more processors.

In operation, a position sensor 635 generates one or more measurement signals in response to a motion of the NED 605. Examples of position sensors 635 include: one or more accelerometers, one or more gyroscopes, one or more magnetometers, one or more altimeters, one or more inclinometers, and/or various types of sensors for motion detection, drift detection, and/or error detection. The position sensors 635 may be located external to the IMU 640, internal to the IMU 640, or some combination thereof.

Based on the one or more measurement signals from one or more position sensors 635, the IMU 640 generates data indicating an estimated current position of the NED 605 relative to an initial position of the NED 605. For example, the position sensors 635 include multiple accelerometers to measure translational motion (forward/back, up/down, left/right) and multiple gyroscopes to measure rotational motion (e.g., pitch, yaw, and roll). In some embodiments, the IMU 640 rapidly samples the measurement signals and calculates the estimated current position of the NED 605 from the sampled data. For example, the IMU 640 integrates the measurement signals received from the accelerometers over time to estimate a velocity vector and integrates the velocity vector over time to determine an estimated current position of a reference point on the NED 605. Alternatively, the IMU 640 provides the sampled measurement signals to the console 670, which analyzes the sample data to determine one or more measurement errors. The console 670 may further transmit one or more of control signals and/or measurement errors to the IMU 640 to configure the IMU 640 to correct and/or reduce one or more measurement errors (e.g., drift errors). The reference point is a point that may be used to describe the position of the NED 605. The reference point may generally be defined as a point in space or a position related to a position and/or orientation of the NED 605.

In various embodiments, the IMU 640 receives one or more parameters from the console 670. The one or more parameters are used to maintain tracking of the NED 605. Based on a received parameter, the IMU 640 may adjust one or more IMU parameters (e.g., a sample rate). In some embodiments, certain parameters cause the IMU 640 to update an initial position of the reference point so that it corresponds to a next position of the reference point. Updating the initial position of the reference point as the next calibrated position of the reference point helps reduce drift errors in detecting a current position estimate of the IMU 640.

In various embodiments, the eye tracking system 645 is integrated into the NED 605. The eye tracking system 645 may comprise one or more illumination sources (e.g., infrared illumination source, visible light illumination source) and one or more imaging devices (e.g., one or more cameras). In operation, the eye tracking system 645 generates and analyzes tracking data related to a user's eyes as the user wears the NED 605. In various embodiments, the eye tracking system 645 estimates the angular orientation of the user's eye. The orientation of the eye corresponds to the direction of the user's gaze within the NED 605. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 6° laterally and +4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 645 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 605 on a user's head. The eye tracking system 645 may also detect the torsion of the eye, i.e., rotation of the eye about the pupillary axis. The eye tracking system 645 may use the detected torsion of the eye to estimate the orientation of the foveal axis from the pupillary axis. The eye tracking system 645 may also track a change in the shape of the eye, which may be approximated as a skew or scaling linear transform or a twisting distortion (e.g., due to torsional deformation). The eye tracking system 645 may estimate the foveal axis based on some combination of the angular orientation of the pupillary axis, the translation of the eye, the torsion of the eye, and the current shape of the eye.

As the orientation may be determined for both eyes of the user, the eye tracking system 645 is able to determine where the user is looking. The NED 605 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and through the point halfway between the pupils of the user's eyes.

In some embodiments, the varifocal module 650 is integrated into the NED 605. The varifocal module 650 may be communicatively coupled to the eye tracking system 645 in order to enable the varifocal module 650 to receive eye tracking information from the eye tracking system 645. The varifocal module 650 may further modify the focus of image light emitted from the display 625 based on the eye tracking information received from the eye tracking system 645. Accordingly, the varifocal module 650 can reduce vergence-accommodation conflict that may be produced as the user's eyes resolve the image light. In various embodiments, the varifocal module 650 can be interfaced (e.g., either mechanically or electrically) with at least one optical element of the optical assembly 630.

In operation, the varifocal module 650 may adjust the position and/or orientation of one or more optical elements in the optical assembly 630 in order to adjust the focus of image light propagating through the optical assembly 630. In various embodiments, the varifocal module 650 may use eye tracking information obtained from the eye tracking system 645 to determine how to adjust one or more optical elements in the optical assembly 630. In some embodiments, the varifocal module 650 may perform foveated rendering of the image light based on the eye tracking information obtained from the eye tracking system 645 in order to adjust the resolution of the image light emitted by the display 625. In this case, the varifocal module 650 configures the display 625 to display a high pixel density in a foveal region of the user's eye-gaze and a low pixel density in other regions of the user's eye-gaze.

The I/O interface 675 facilitates the transfer of action requests from a user to the console 670. In addition, the I/O interface 675 facilitates the transfer of device feedback from the console 670 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 675 may include one or more input devices. Example input devices include: a keyboard, a mouse, a game controller, a joystick, and/or any other suitable device for receiving action requests and communicating the action requests to the console 670. In some embodiments, the I/O interface 675 includes an IMU 640 that captures calibration data indicating an estimated current position of the I/O interface 675 relative to an initial position of the I/O interface 675.

In operation, the I/O interface 675 receives action requests from the user and transmits those action requests to the console 670. Responsive to receiving the action request, the console 670 performs a corresponding action. For example, responsive to receiving an action request, console 670 may configure I/O interface 675 to emit haptic feedback onto an arm of the user. For example, console 670 may configure I/O interface 675 to deliver haptic feedback to a user when an action request is received. Additionally or alternatively, the console 670 may configure the I/O interface 675 to generate haptic feedback when the console 670 performs an action, responsive to receiving an action request.

The console 670 provides content to the NED 605 for processing in accordance with information received from one or more of: the DCA 655, the eye tracking system 645, one or more other components of the NED 605, and the I/O interface 675. In the embodiment shown in FIG. 6, the console 670 includes an application store 660 and an engine 665. In some embodiments, the console 670 may have additional, fewer, or different modules and/or components than those described in conjunction with FIG. 6. Similarly, the functions further described below may be distributed among components of the console 670 in a different manner than described in conjunction with FIG. 6.

The application store 660 stores one or more applications for execution by the console 670. An application is a group of instructions that, when executed by a processor, performs a particular set of functions, such as generating content for presentation to the user. For example, an application may generate content in response to receiving inputs from a user (e.g., via movement of the NED 605 as the user moves his/her head, via the I/O interface 675, etc.). Examples of applications include: gaming applications, conferencing applications, video playback applications, or other suitable applications.

In some embodiments, the engine 665 generates a three-dimensional mapping of the area surrounding the NED 605 (i.e., the "local area") based on information received from the NED 605. In some embodiments, the engine 665 determines depth information for the three-dimensional mapping of the local area based on depth data received from the NED 605. In various embodiments, the engine 665 uses depth data received from the NED 605 to update a model of the local area and to generate and/or modify media content based in part on the updated model of the local area.

The engine 665 also executes applications within the NED system 600 and receives position information, acceleration information, velocity information, predicted future positions, or some combination thereof, of the NED 605. Based on the received information, the engine 665 determines various forms of media content to transmit to the NED 605 for presentation to the user. For example, if the received information indicates that the user has looked to the left, the engine 665 generates media content for the NED 605 that mirrors the user's movement in a virtual environment or in an environment augmenting the local area with additional media content. Accordingly, the engine 665 may generate and/or modify media content (e.g., visual and/or audio content) for presentation to the user. The engine 665 may further transmit the media content to the NED 605. Additionally, in response to receiving an action request from the I/O interface 675, the engine 665 may perform an action within an application executing on the console 670. The engine 665 may further provide feedback when the action is performed. For example, the engine 665 may configure the NED 605 to generate visual and/or audio feedback and/or the I/O interface 675 to generate haptic feedback to the user.

In some embodiments, based on the eye tracking information (e.g., orientation of the user's eye) received from the eye tracking system 645, the engine 665 determines a resolution of the media content provided to the NED 605 for presentation to the user on the display 625. The engine 665 may adjust a resolution of the visual content provided to the NED 605 by configuring the display 625 to perform foveated rendering of the visual content, based at least in part on a direction of the user's gaze received from the eye tracking system 645. The engine 665 provides the content to the NED 605 having a high resolution on the display 625 in a foveal region of the user's gaze and a low resolution in other regions, thereby reducing the power consumption of the NED 605. In addition, using foveated rendering reduces a number of computing cycles used in rendering visual content without compromising the quality of the user's visual experience. In some embodiments, the engine 665 can further use the eye tracking information to adjust a focus of the image light emitted from the display 625 in order to reduce vergence-accommodation conflicts.

Figure 7A:
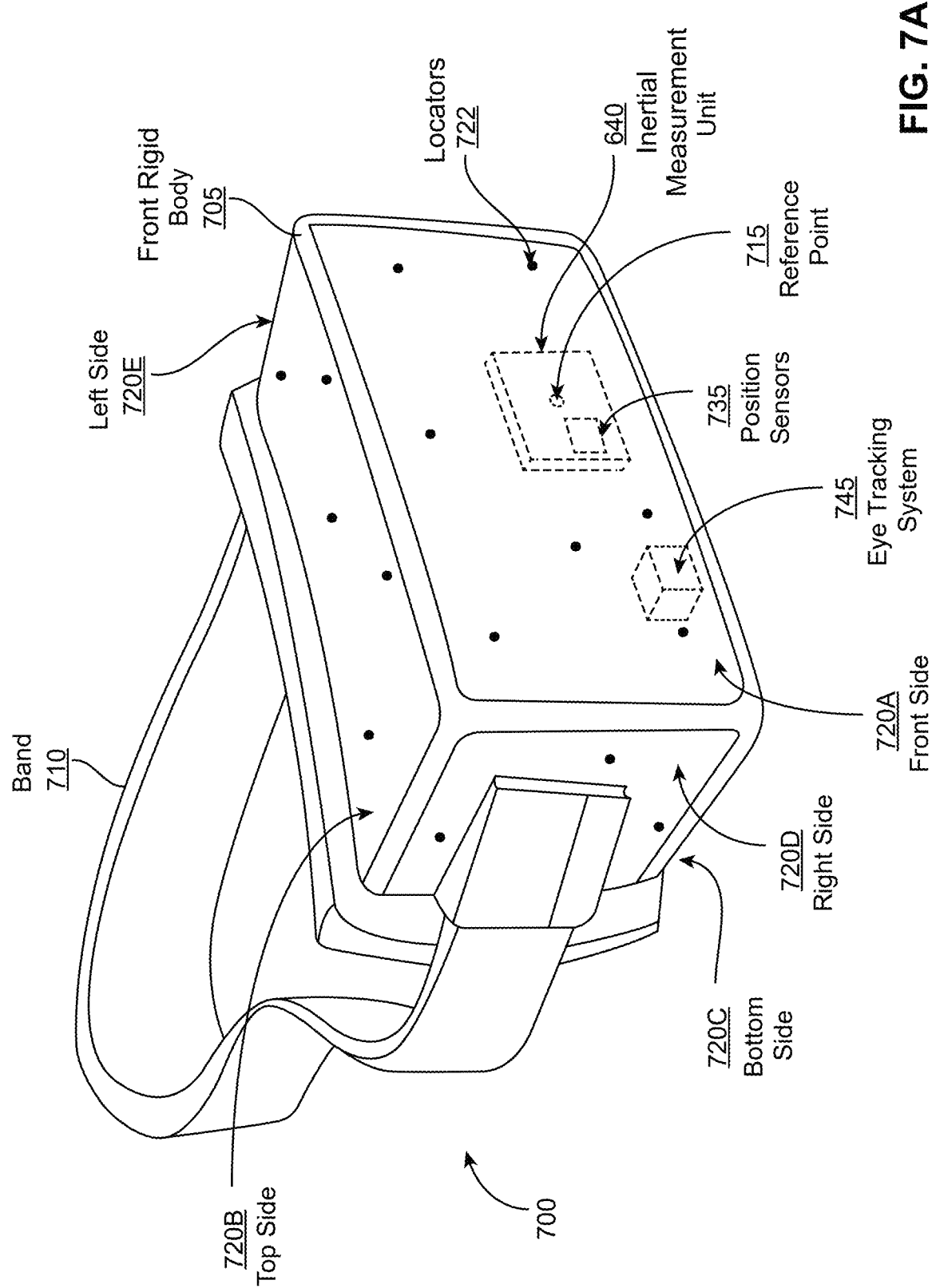
FIG. 7A is a diagram of an NED, according to various embodiments.

FIG. 7A is a diagram of an NED 700, according to various embodiments. In various embodiments, NED 700 presents media to a user. The media may include visual, auditory, and haptic content. In some embodiments, NED 700 provides artificial reality (e.g., virtual reality) content by providing a real-world environment and/or computer-generated content. In some embodiments, the computer-generated content may include visual, auditory, and haptic information. The NED 700 is an embodiment of the NED 605 and includes a front rigid body 705 and a band 710. The front rigid body 705 includes an electronic display element of the electronic display 625 (not shown in FIG. 7A), the optical assembly 630 (not shown in FIG. 7A), the IMU 640, the one or more position sensors 735, the eye tracking system 745, and the locators 722. In the embodiment shown by FIG. 7A, the position sensors 735 are located within the IMU 640, and neither the IMU 640 nor the position sensors 735 are visible to the user.

The locators 722 are located in fixed positions on the front rigid body 705 relative to one another and relative to a reference point 715. In the example of FIG. 7A, the reference point 715 is located at the center of the IMU 640. Each of the locators 722 emits light that is detectable by the imaging device in the DCA 655. The locators 722, or portions of the locators 722, are located on a front side 720A, a top side 720B, a bottom side 720C, a right side 720D, and a left side 720E of the front rigid body 705 in the example of FIG. 7A.

The NED 700 includes the eye tracking system 745. As discussed above, the eye tracking system 745 may include a structured light generator that projects an interferometric structured light pattern onto the user's eye and a camera to detect the illuminated portion of the eye. The structured light generator and the camera may be located off the axis of the user's gaze. In various embodiments, the eye tracking system 745 may include, additionally or alternatively, one or more time-of-flight sensors and/or one or more stereo depth sensors. In FIG. 7A, the eye tracking system 745 is located below the axis of the user's gaze, although the eye tracking system 745 can alternately be placed elsewhere. Also, in some embodiments, there is at least one eye tracking unit for the left eye of the user and at least one tracking unit for the right eye of the user.

In various embodiments, the eye tracking system 745 includes one or more cameras on the inside of the NED 700. The camera(s) of the eye tracking system 745 may be directed inwards, toward one or both eyes of the user while the user is wearing the NED 700, so that the camera(s) may image the eye(s) and eye region(s) of the user wearing the NED 700. The camera(s) may be located off the axis of the user's gaze. In some embodiments, the eye tracking system 745 includes separate cameras for the left eye and the right eye (e.g., one or more cameras directed toward the left eye of the user and, separately, one or more cameras directed toward the right eye of the user).

Figure 7B:
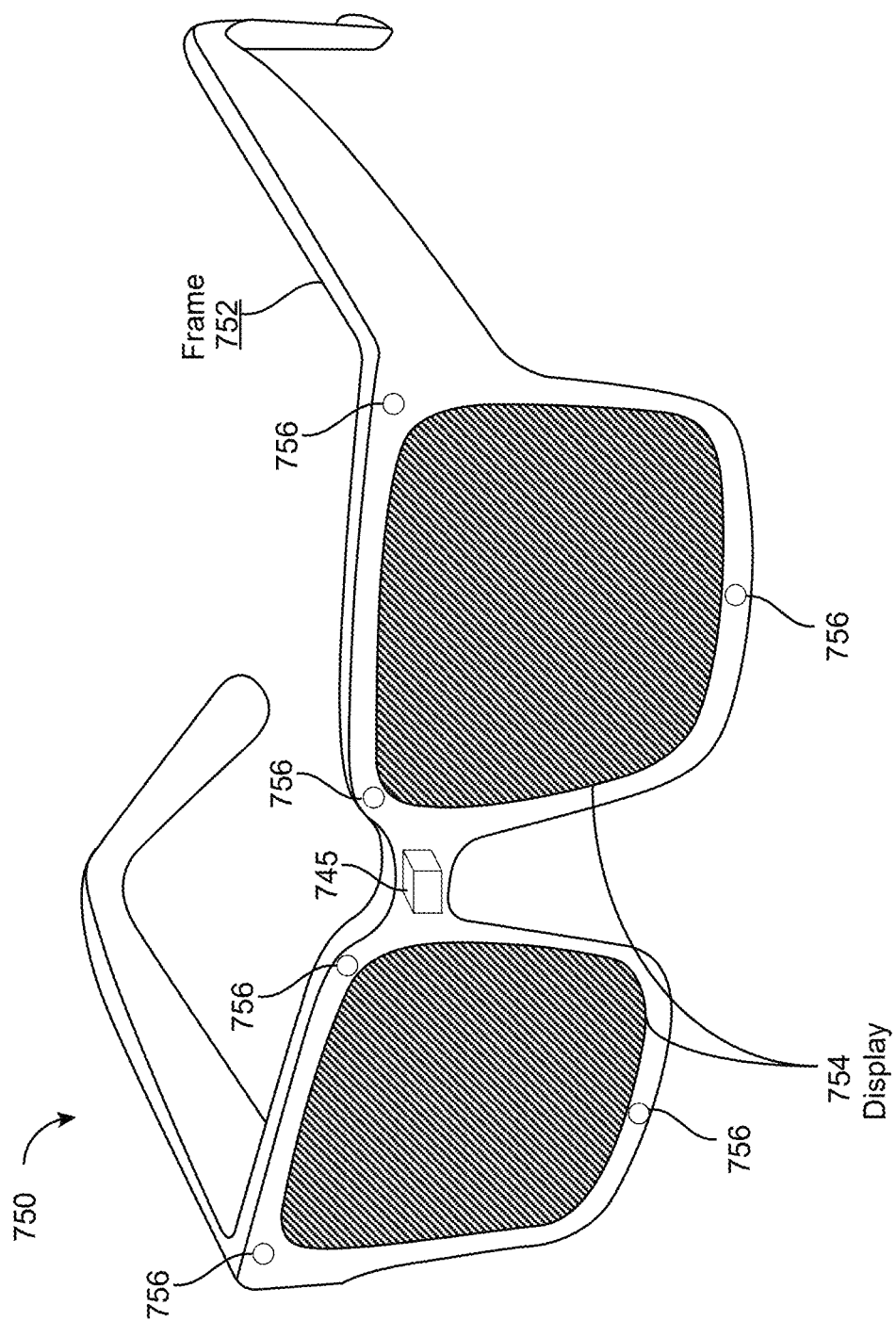
FIG. 7B is another diagram of an NED, according to various embodiments.

FIG. 7B is a diagram of an NED 750, according to various embodiments. In various embodiments, NED 750 presents media to a user. The media may include visual, auditory, and haptic content. In some embodiments, NED 750 provides artificial reality (e.g., augmented reality) content by providing a real-world environment and/or computer-generated content. In some embodiments, the computer-generated content may include visual, auditory, and haptic information. The NED 750 is an embodiment of the NED 605.

NED 750 includes frame 752 and display 754. In various embodiments, the NED 750 may include one or more additional elements. Display 754 may be positioned at different locations on the NED 750 than the locations illustrated in FIG. 7B. Display 754 is configured to provide content to the user, including audiovisual content. In some embodiments, one or more displays 754 may be located within frame 752.

NED 750 further includes eye tracking system 745 and one or more corresponding modules 756. The modules 756 may include emitters (e.g., light emitters) and/or sensors (e.g., image sensors, cameras). In various embodiments, the modules 756 are arranged at various positions along the inner surface of the frame 752, so that the modules 756 are facing the eyes of a user wearing the NED 750. For example, the modules 756 could include emitters that emit structured light patterns onto the eyes and image sensors to capture images of the structured light pattern on the eyes. As another example, the modules 756 could include multiple time-of-flight sensors for directing light at the eyes and measuring the time of travel of the light at each pixel of the sensors. As a further example, the modules 756 could include multiple stereo depth sensors for capturing images of the eyes from different vantage points. In various embodiments, the modules 756 also include image sensors for capturing 2D images of the eyes.

In sum, the disclosed techniques train and execute a machine learning model to perform targeted generative visual editing of images, in which visual content depicted in a driver image is used to modify a region of a source image in a semantically consistent manner. Input into the machine learning model includes the driver image that depicts a first set of visual attributes, as well as a source image that depicts a second set of visual attributes and includes a masked region to be blended with the driver image. In response to the input, the machine learning model generates an output image that depicts the second set of visual attributes and context of the source image outside of the region. The output image also replaces the second set of visual attributes within the region with the first set of visual attributes from the driver image while maintaining the context of the source image within the region. For example, the source image could depict a model wearing a dress, the masked region in the source image could include a lower portion of the dress, and the driver image could include a patch of material from another garment. Given this input, the machine learning model could generate an output image that shows the model wearing the dress, with the lower portion of the dress replaced with the material from the other garment.

Training data for the machine learning model includes a set of training output images, regions defined within the training output images, and training driver images that are generated by applying transformations to the regions of the corresponding training output images. The machine learning model is trained to generate the training output images, given input that includes the training driver images and portions of the training output images that lie outside the regions. For example, a region within a training output image could be defined using a bounding box and/or a semantic segmentation of the training output image. The region could also be removed from the training output image to generate a training source image. A driver image could be generated as a crop of the region, where the position and size of the crop is randomized. The training source image and the training driver image could be inputted into the machine learning model, and the parameters of the machine learning model could be updated in a way that reduces one or more losses between a representation of an output image generated by the machine learning model from the input and a representation of the corresponding training output image. The machine learning model would thus learn to transfer visual attributes from the driver image to the missing region in the source image while maintaining the spatial or semantic context from the training output image in all parts of the output image.

One technical advantage of the disclosed techniques relative to the prior art is the use of visual attributes that are depicted in a driver image in guiding an image editing task. Accordingly, the disclosed techniques allow image editing tasks to be performed with greater precision and control than conventional approaches that rely on text-based descriptions of visual content to edit images. Another technical advantage of the disclosed techniques is that machine learning components involved in the image editing task can be trained in a self-supervised manner using a large set of training data. This increase in training data allows the machine learning components to more comprehensively model probability distributions associated with the image editing task, thereby improving the performance of the machine learning components in performing the image editing task. These technical advantages provide one or more technological improvements over prior art approaches.

1. In some embodiments, a computer-implemented method for combining a source image and a driver image comprises determining a first region of the source image to be blended with the driver image; inputting a second region of the source image that lies outside of the first region and the driver image into a neural network; and generating, via the neural network, an output image that includes a third region corresponding to the first region of the source image and a fourth region corresponding to the second region of the source image, wherein the third region includes one or more visual attributes of the driver image and a context associated with the source image and the fourth region includes one or more visual attributes of the second region of the source image and the context associated with the source image.

2. The computer-implemented method of clause 1, further comprising applying a transformation to a fifth region of a training output image to generate a training driver image; inputting a sixth region of the training output image that lies outside of the fifth region and the training driver image into the neural network; and training one or more components of the neural network based on a loss associated with the training output image and an output generated by the neural network based on the sixth region of the training output image and the training driver image.

3. The computer-implemented method of any of clauses 1-2, further comprising training one or more additional components of the neural network based on a first reconstruction of the training output image and a second reconstruction of the training driver image.

4. The computer-implemented method of any of clauses 1-3, wherein the transformation comprises a randomized crop of the fifth region.

5. The computer-implemented method of any of clauses 1-4, wherein the loss comprises a negative log-likelihood.

6. The computer-implemented method of any of clauses 1-5, wherein generating the output image comprises converting the second region of the source image into a first encoded representation; and converting the driver image into a second encoded representation.

7. The computer-implemented method of any of clauses 1-6, wherein generating the output image further comprises converting the first encoded representation and the second encoded representation into a third encoded representation; and decoding the third encoded representation to generate the output image.

8. The computer-implemented method of any of clauses 1-7, wherein inputting the second region of the source image into the neural network comprises combining the source image with a binary mask representing the first region to generate a masked source image; and inputting the masked source image into the neural network.

9. The computer-implemented method of any of clauses 1-8, wherein the neural network comprises an autoregressive model that implements a conditional probability distribution associated with the output image, the source image, the driver image, and the first region of the source image.

10. The computer-implemented method of any of clauses 1-9, wherein the first region comprises at least one of a bounding box or a semantic segmentation.

11. In some embodiments, one or more non-transitory computer-readable media storing instructions that, when executed by one or more processors, cause the one or more processors to perform the steps of determining a first region of a source image to be blended with a driver image; inputting a second region of the source image that lies outside of the first region and the driver image into a neural network; and generating, via the neural network, an output image that includes a third region corresponding to the first region of the source image and a fourth region corresponding to the second region of the source image, wherein the third region includes one or more visual attributes of the driver image and a context associated with the source image and the fourth region includes one or more visual attributes of the second region of the source image and the context associated with the source image.

12. The one or more non-transitory computer-readable media of clause 11, wherein the instructions further cause the one or more processors to perform the steps of applying a transformation to a fifth region of a training output image to generate a training driver image; inputting a sixth region of the training output image that lies outside of the fifth region and the training driver image into the neural network; and training one or more components of the neural network based on a loss associated with the training output image and an output generated by the neural network based on the sixth region of the training output image and the training driver image.

13. The one or more non-transitory computer-readable media of any of clauses 11-12, further comprising training one or more additional components of the neural network based on a first reconstruction of the training output image, a second reconstruction of the training driver image, and one or more perceptual losses.

14. The one or more non-transitory computer-readable media of any of clauses 11-13, wherein the one or more additional components comprise a set of encoders and a set of decoders.

15. The one or more non-transitory computer-readable media of any of clauses 11-14, wherein the one or more components comprise a transformer.

16. The one or more non-transitory computer-readable media of any of clauses 11-15, wherein the fifth region comprises at least one of a bounding box or a semantic segmentation.

17. The one or more non-transitory computer-readable media of any of clauses 11-16, wherein generating the output image comprises converting the second region of the source image into a first encoded representation; converting the driver image into a second encoded representation; converting a token sequence that includes the first encoded representation and the second encoded representation into a third encoded representation; and decoding the third encoded representation to generate the output image.

18. The one or more non-transitory computer-readable media of any of clauses 11-17, wherein at least one of the first encoded representation or the second encoded representation comprises a set of quantized tokens.

19. The one or more non-transitory computer-readable media of any of clauses 11-18, wherein determining the first region of the source image comprises receiving the first region from a user.

20. In some embodiments, a system comprises one or more memories that store instructions, and one or more processors that are coupled to the one or more memories and, when executing the instructions, are configured to perform the steps of determining a first region of a source image to be blended with a driver image; inputting a second region of the source image that lies outside of the first region and the driver image into a neural network; and generating, via the neural network, an output image that includes a third region corresponding to the first region of the source image and a fourth region corresponding to the second region of the source image, wherein the third region includes one or more visual attributes of the driver image and a context associated with the source image and the fourth region includes one or more visual attributes of the second region of the source image and the context associated with the source image.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   determining, via a processor, a first region of a source image to be blended with a driver image;
   inputting, via the processor, a second region of the source image that lies outside of the first region and the driver image into a neural network; and
   generating, via the neural network, an output image that includes a third region corresponding to the first region of the source image and a fourth region corresponding to the second region of the source image, wherein the third region includes one or more visual attributes of the driver image and a context associated with the source image and the fourth region includes one or more visual attributes of the second region of the source image and the context associated with the source image.

2. The method of claim 1, further comprising:
   applying a transformation to a fifth region of a training output image to generate a training driver image;
   inputting a sixth region of the training output image that lies outside of the fifth region and the training driver image into the neural network; and
   training one or more components of the neural network based on a loss associated with the training output image and an output generated by the neural network based on the sixth region of the training output image and the training driver image.

3. The method of claim 2, further comprising training one or more additional components of the neural network based on a first reconstruction of the training output image and a second reconstruction of the training driver image.

4. The method of claim 2, wherein the transformation comprises a randomized crop of the fifth region.

5. The method of claim 2, wherein the loss comprises a negative log-likelihood.

6. The method of claim 1, wherein generating the output image comprises:
   converting the second region of the source image into a first encoded representation; and
   converting the driver image into a second encoded representation.

7. The method of claim 6, wherein generating the output image further comprises:
   converting the first encoded representation and the second encoded representation into a third encoded representation; and
   decoding the third encoded representation to generate the output image.

8. The method of claim 1, wherein inputting the second region of the source image into the neural network comprises:
   combining the source image with a binary mask representing the first region to generate a masked source image; and
   inputting the masked source image into the neural network.

9. The method of claim 1, wherein the neural network comprises an autoregressive model that implements a conditional probability distribution associated with the output image, the source image, the driver image, and the first region of the source image.

10. The method of claim 1, wherein the first region comprises at least one of a bounding box or a semantic segmentation.

11. One or more non-transitory computer-readable media storing instructions that, when executed by one or more processors, cause the one or more processors to perform:
    determining a first region of a source image to be blended with a driver image;
    inputting a second region of the source image that lies outside of the first region and the driver image into a neural network; and
    generating, via the neural network, an output image that includes a third region corresponding to the first region of the source image and a fourth region corresponding to the second region of the source image, wherein the third region includes one or more visual attributes of the driver image and a context associated with the source image and the fourth region includes one or more visual attributes of the second region of the source image and the context associated with the source image.

12. The one or more non-transitory computer-readable media of claim 11, wherein the instructions further cause the one or more processors to perform:
    applying a transformation to a fifth region of a training output image to generate a training driver image;
    inputting a sixth region of the training output image that lies outside of the fifth region and the training driver image into the neural network; and
    training one or more components of the neural network based on a loss associated with the training output image and an output generated by the neural network based on the sixth region of the training output image and the training driver image.

13. The one or more non-transitory computer-readable media of claim 12, wherein the instructions further cause the one or more processors to perform:
    training one or more additional components of the neural network based on a first reconstruction of the training output image, a second reconstruction of the training driver image, and one or more perceptual losses.

14. The one or more non-transitory computer-readable media of claim 13, wherein the one or more additional components comprise a set of encoders and a set of decoders.

15. The one or more non-transitory computer-readable media of claim 12, wherein the one or more components comprise a transformer.

16. The one or more non-transitory computer-readable media of claim 12, wherein the fifth region comprises at least one of a bounding box or a semantic segmentation.

17. The one or more non-transitory computer-readable media of claim 11, wherein the generating the output image comprises:
    converting the second region of the source image into a first encoded representation;
    converting the driver image into a second encoded representation;
    converting a token sequence that includes the first encoded representation and the second encoded representation into a third encoded representation; and
    decoding the third encoded representation to generate the output image.

18. The one or more non-transitory computer-readable media of claim 17, wherein at least one of the first encoded representation or the second encoded representation comprises a set of quantized tokens.

19. The one or more non-transitory computer-readable media of claim 11, wherein determining the first region of the source image comprises receiving the first region from a user.

20. A system comprising:
one or more memories that store instructions; and
one or more processors that are coupled to the one or more memories, which when executing the instructions, are configured to perform: determine a first region of a source image to be blended with a driver image;
input a second region of the source image that lies outside of the first region and the driver image into a neural network; and
generate, via the neural network, an output image that includes a third region corresponding to the first region of the source image and a fourth region corresponding to the second region of the source image, wherein the third region includes one or more visual attributes of the driver image and a context associated with the source image and the fourth region includes one or more visual attributes of the second region of the source image and the context associated with the source image.

* * * * *